United States Patent
Post

[15] 3,683,216
[45] Aug. 8, 1972

[54] INERTIAL ENERGY STORAGE APPARATUS AND SYSTEM FOR UTILIZING THE SAME

[72] Inventor: Richard F. Post, Walnut Creek, Calif.

[73] Assignees: Darrell E. Williams; T. Kenneth Fowler, Walnut Creek, Calif. ; part interest to each

[22] Filed: Feb. 24, 1971

[21] Appl. No.: 118,227

[52] U.S. Cl. .........................310/67, 310/74, 74/572
[51] Int. Cl. ...............................................H02k 7/02
[58] Field of Search .......310/67, 74; 308/10; 74/572; 180/54.65; 290/30; 104/148

[56] References Cited

UNITED STATES PATENTS

| | | |
|---|---|---|
| 3,602,067 | 8/1971 | Weatherby, Jr. .............74/572 |
| 2,589,453 | 3/1952 | Storsand....................104/148 |
| 2,704,231 | 3/1955 | Goldsmith ..................308/10 |
| 3,027,471 | 3/1962 | Burgwin et al...............310/74 |
| 3,296,886 | 1/1967 | Reinhart, Jr.................74/572 |
| 3,436,572 | 4/1969 | Storsand.....................310/74 |
| 3,512,021 | 5/1970 | Laurent, Jr..................310/67 |

Primary Examiner—D. X. Sliney
Attorney—Rankin A. Milliken

[57] ABSTRACT

Inertial energy storage apparatus having two contrarotating rotors the fellies of which include a number of thin rings of glass or embedded fiber composite material supported by elastic support means so that the radial separations between adjacent rings produced by centrifugal force do not cause failure of the rotors by mechanical rupture of the ring support means. The materials of the rings are selected from those glasses or composite materials for which the modulus $U_0$, that is the ratio of the maximum tensile strength of the material to twice its density, exceeds 300 Joules per gram. The rotors have alternator-motors in their hubs, by means of which they are brought to speed, and by means of which the inertial energy stored in them is extracted in the form of variable-frequency alternating output voltage. This output voltage is converted by a solid-state cycloconverter to alternating current of selectively variable frequency by means of which to power, for instance, the three-phase, squirrel-cage wheel motors of a non-pollution-producing automotive vehicle.

19 Claims, 16 Drawing Figures

INVENTOR
RICHARD F. POST
BY Rankin K Milliken
ATTORNEY

INVENTOR
RICHARD F. POST

INVENTOR
RICHARD F. POST

INVENTOR
RICHARD F. POST

INVENTOR
RICHARD F. POST
BY
ATTORNEY

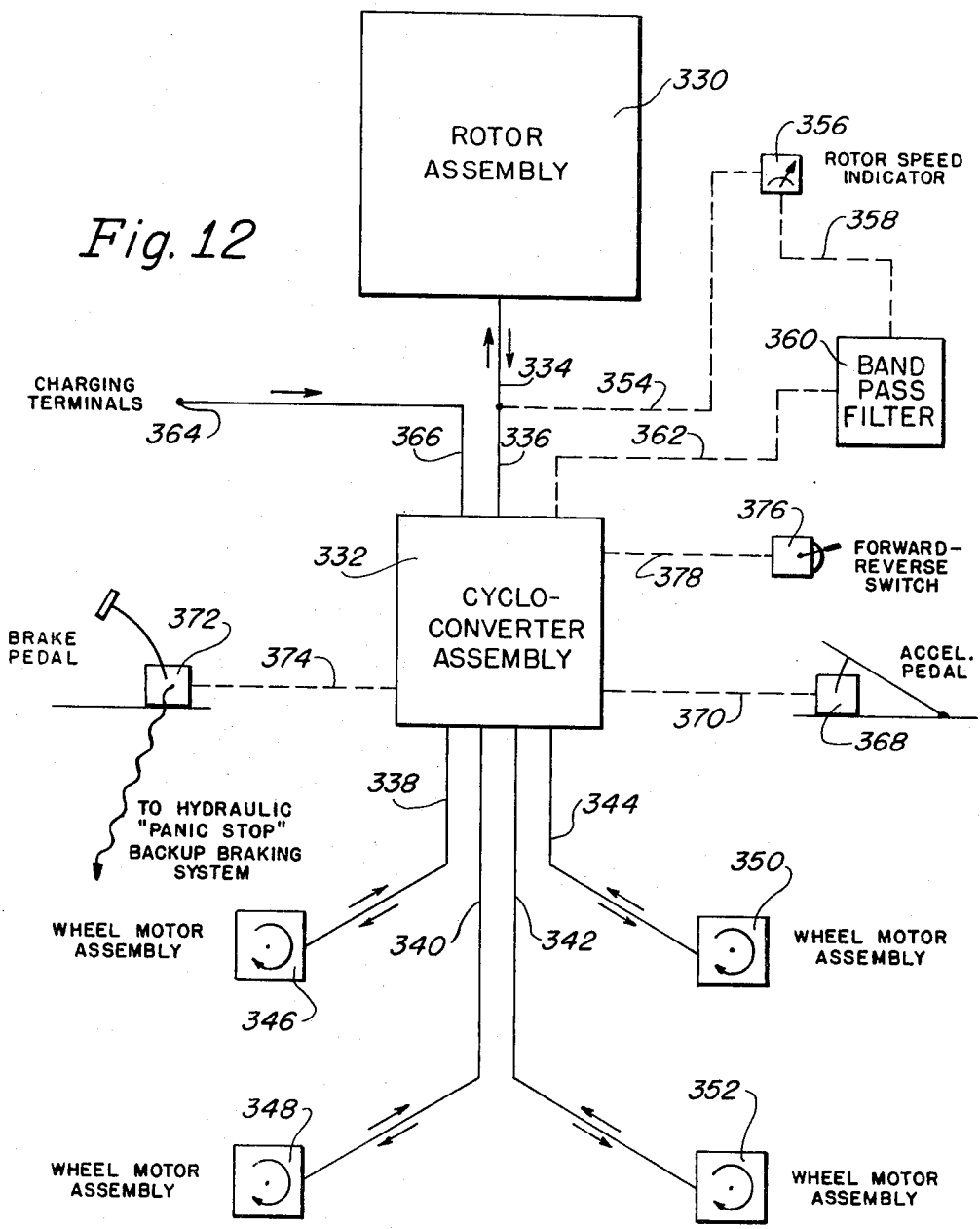

INERTIAL ENERGY STORAGE APPARATUS AND SYSTEM FOR UTILIZING THE SAME

The present invention relates to inertial energy storage apparatus of the kind in which inertial energy is stored in a rotor and extracted therefrom by means of an electrical generator coupled thereto, and more particularly to improved rotors for use in such apparatus, and to improved systems for utilizing such apparatus.

Vehicles propelled by energy derived from inertial energy storage apparatus have hitherto been made and used. A vehicle of this type, which was put into regular service in a major city, was a bus driven by power derived from a 3,300-pound, 64 inch diameter, conventional flywheel. The range of this vehicle on a single charge of rotational energy to the flywheel was limited to somewhat over one-half mile, however, and in consequence it was necessary to provide charging facilities at each bus stop, full charging at which required about two minutes.

More recently, proposals have been made for the utilization of diametrically-directed straight strands of tensilely anisotropic materials in inertial energy storage rotors. These proposed constructions are said to achieve considerable increase in energy storage capacity as compared with the abovesaid bus propulsion system, but have not reached the energy storage capacity values which would appear to be required in order to make inertial energy propelled vehicles attractive as substitutes for the present, pollution-producing internal combustion engine powered vehicles in general use.

In addition to low energy storage capacity, prior art inertial energy storage propulsion systems for vehicles have also suffered from excessive standing loss, i.e., dissipation of the stored energy while the vehicle is standing.

Other prior art vehicular propulsion systems are either unilateral, i.e., incapable of reconverting the kinetic energy of the vehicle to stored energy, or have low reconversion efficiency, i.e., low efficiency in reconverting the kinetic energy of the moving vehicle to stored energy. The internal combustion vehicular propulsion systems found in most passenger automobiles today are unilateral. The currently proposed vehicular propulsion systems using storage batteries for energy storage and recharging the storage batteries with electrical energy derived from their wheel motors acting as generators are generally characterized by low reconversion efficiency.

These deficiencies of the vehicular propulsion systems of the prior art must be overcome in order to assure that the pollution-producing internal combustion engine propelled vehicles now in general use will be voluntarily replaced with pollution-free vehicles.

The need for maximizing the energy storage capacities (both per unit mass and per unit volume) of inertial energy storage apparatus suitable for use in inertia-electric vehicular propulsion systems is substantially axiomatic, since the energy required for transporting the inertial energy storage apparatus itself is thereby reduced, with accompanying reductions in both vehicle operating cost and drain on the world's energy supply. This requirement is particularly critical in passenger vehicles, such as taxis and private passenger automobiles, in which maximum range per energy charge must be achieved without unduly sacrificing available passenger and cargo volume or payload.

The achievement of high levels of bilateral conversion efficiency (i.e., both high conversion efficiency and high reconversion efficiency) in inertia-electric vehicles is of major importance, both for conservation of world energy resources and for rendering such vehicles economically attractive, thereby offering an inducement to potential users to voluntarily convert from pollution-producing internal combustion systems to non-polluting inertial systems. Inertia-electric vehicular propulsion systems of high bilateral conversion efficiency offer the possibility of achieving far greater overall national transport system efficiency and lower vehicle operating costs than present day internal combustion vehicular propulsion systems, for the reason that the kinetic energy of internal combustion powered vehicles obviously cannot be reconverted to fossil fuel, and thus the energy dissipated in the form of heat by the braking and decelerating of internal combustion powered vehicles is necessarily wasted, whereas the available kinetic energy of a high bilateral conversion efficiency inertia-electric vehicle may be reconverted to stored inertial energy at a considerable level of efficiency.

It is also necessary to reduce the standing losses of inertia-electric vehicles to acceptable levels, not only to minimize dissipation of available world energy resources and to render inertia-electric vehicles economically attractive, but also to make the operating range and maximum standing time of inertia-electric vehicles comparable to those of present gasoline-powered vehicles.

It is therefore an object of the present invention to provide inertial energy storage apparatus the energy storage capacity of which per unit mass is greater than has hitherto been achieved.

A further object of the present invention is to provide an inertia-electric vehicle propulsion system characterized by high bilateral conversion efficiency.

Yet another object of the present invention is to provide inertial energy storage apparatus characterized by lower standing loss than has hitherto been achieved.

Other objects of the invention will in part be obvious and will in part appear hereinafter.

With these objects in view, the present invention comprises as a principal feature the provision of a novel rotor for use in inertial energy storage apparatus. The felly of this novel rotor is comprised of a plurality of rings of substantially non-setting material whose rotational energy capacity per unit mass ($U_0$) exceeds 300 Joules per gram, said rings being supported by elastic means so that the radial separations between successive rings produced by centrifugal force are accommodated without causing failure of the rotor.

According to another principal feature of the present invention, said rings of non-setting material are made thin so that each ring experiences substantially only hoop tension (i.e., pure circumferential tensile forces), thus permitting the use of brittle ring materials such as fused quartz, which possess great tensile strength, but very little resistance to concentrated stress.

In accordance with still another principal feature of the present invention said rings are made from materials whose tensile strength is dependent upon the condition of their surfaces, which are properly prepared and thereafter protected. By the use of individual rings, each one of which may be fabricated, protected by suitable coatings, and tested for strength before final assembly of the rotor, rotors having moduli of maximum stored energy density (the ratio of the maximum tensile strength of the ring material to twice the density of the material), $U_O$, 10 to 100 times those typically found in conventional solid metallic fly-wheels may be achieved.

Yet another principal feature of the present invention is the employment in an inertia-electric vehicular propulsion system of a solid-state cycloconverter, whereby a high level of bilateral energy conversion efficiency is attained.

Yet another characteristic feature of the present invention is the journalling of inertial energy storage rotors in periodic magnetic bearings, which have the property that they provide stable centering forces as long as the rotation speed lies above a minimum critical speed determined by the characteristics of the bearing pole faces, said periodic magnetic bearings being essentially frictionless.

A further feature of certain embodiments of the present invention is the employment of like, contrarotating inertial energy storage rotors, whereby undesirable gyroscopic effects are obviated or substantially reduced in vehicular applications of the inertial energy storage apparatus of the present invention.

A further principal feature of the present invention is the fabrication of the said rotor rings from substantially non-setting materials, such as are shown to the right of the 300 Joule per gram graduation of FIG. 4 of the present drawings.

Yet another principal feature of the present invention is the fabrication of the rotor rings of certain preferred embodiments from tensilely isotropic materials (including, but not limited to, fused quartz).

Other features of the present invention are disclosed hereinafter.

The present invention, accordingly comprises, but is not limited to, the features of construction, materials, combinations of elements, and arrangements of parts which will be exemplified in the constructions hereinafter set forth, and the scope of the invention will be indicated in the appended claims.

For a fuller understanding of the nature and objects of the invention, reference should be had to the following detailed description, taken in connection with the accompanying drawings, in which.

Figure 8:
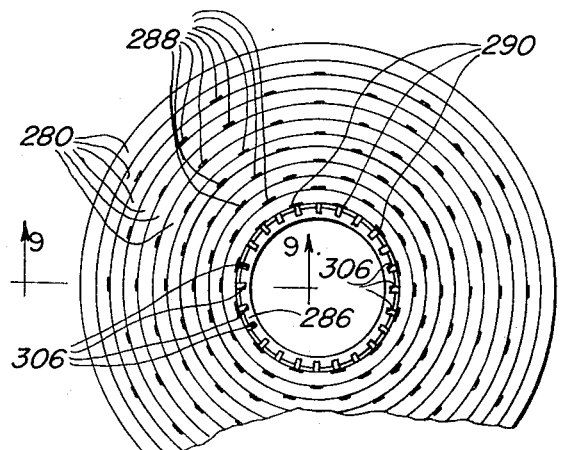
Figure 9:
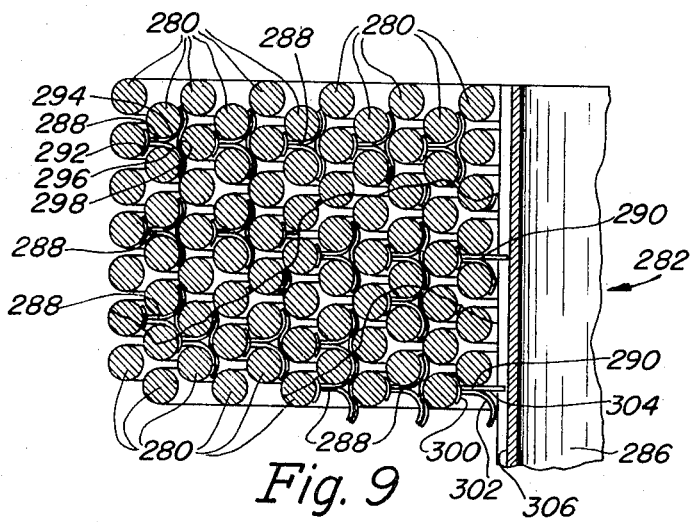
Figure 10:
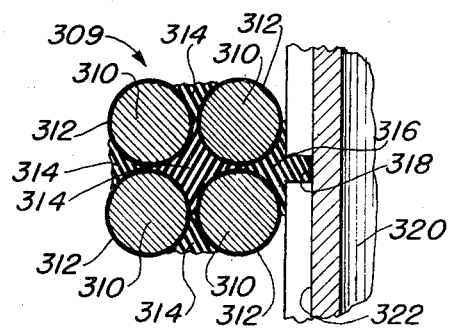
Figure 9A:
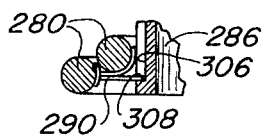
Figure 11:
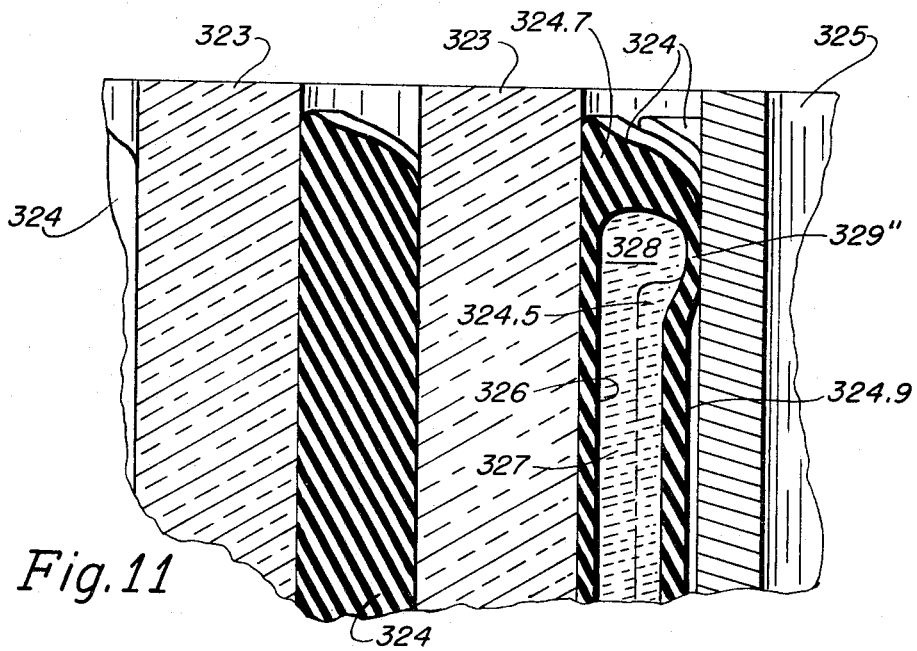
Figure 11A:
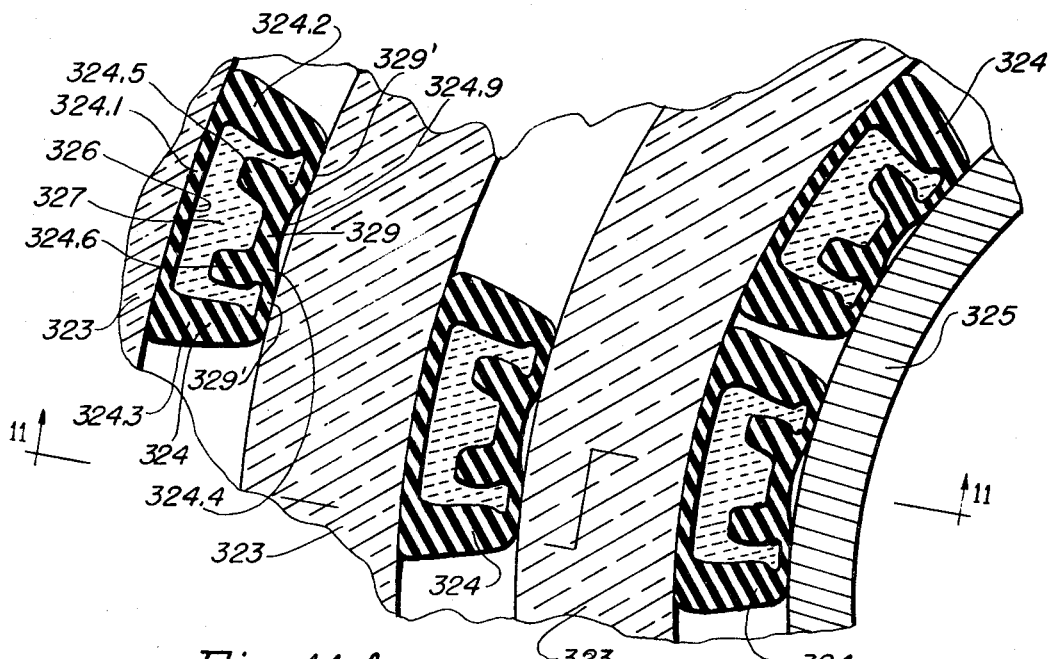

FIGS. 5, 6, 6A, and 7 illustrate the structure of an inertial energy storage rotor felly embodying certain features of the present invention;

FIGS. 8, 9 and 9A illustrate the structure of an inertial energy storage rotor felly embodying certain features of the present invention;

FIG. 10 illustrates the structure of an inertial energy storage rotor felly embodying certain features of the present invention;

FIGS. 11 and 11A illustrate the structure of an inertial energy storage rotor felly embodying certain features of the present invention;

FIG. 12 is a schematic diagram of an inertia-electric vehicular propulsion system embodying certain features of the present invention.

Figure 1:
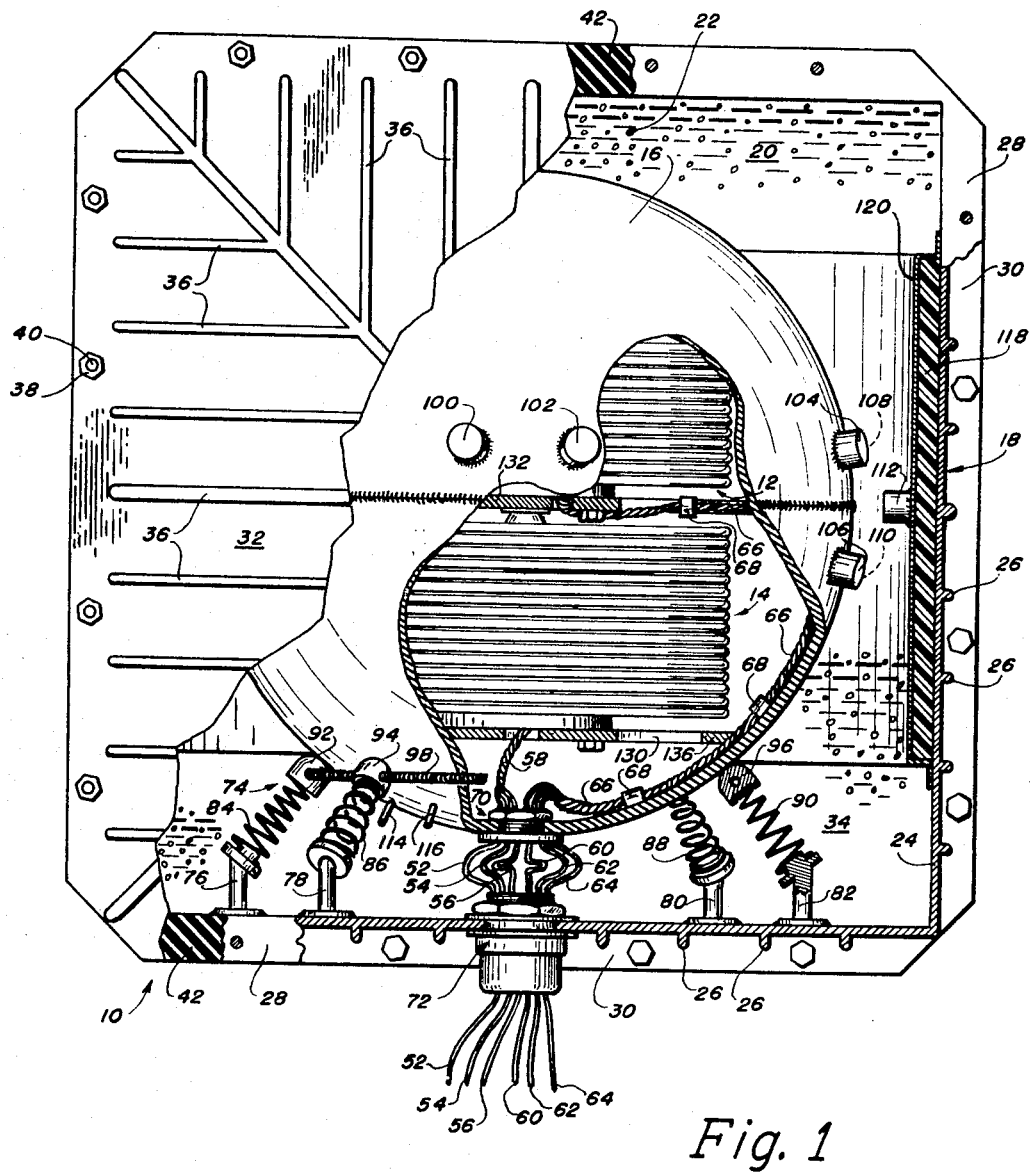
FIG. 1 is a detailed side view in section of an inertial energy storage module embodying certain characteristic features of the present invention.
Figure 2:
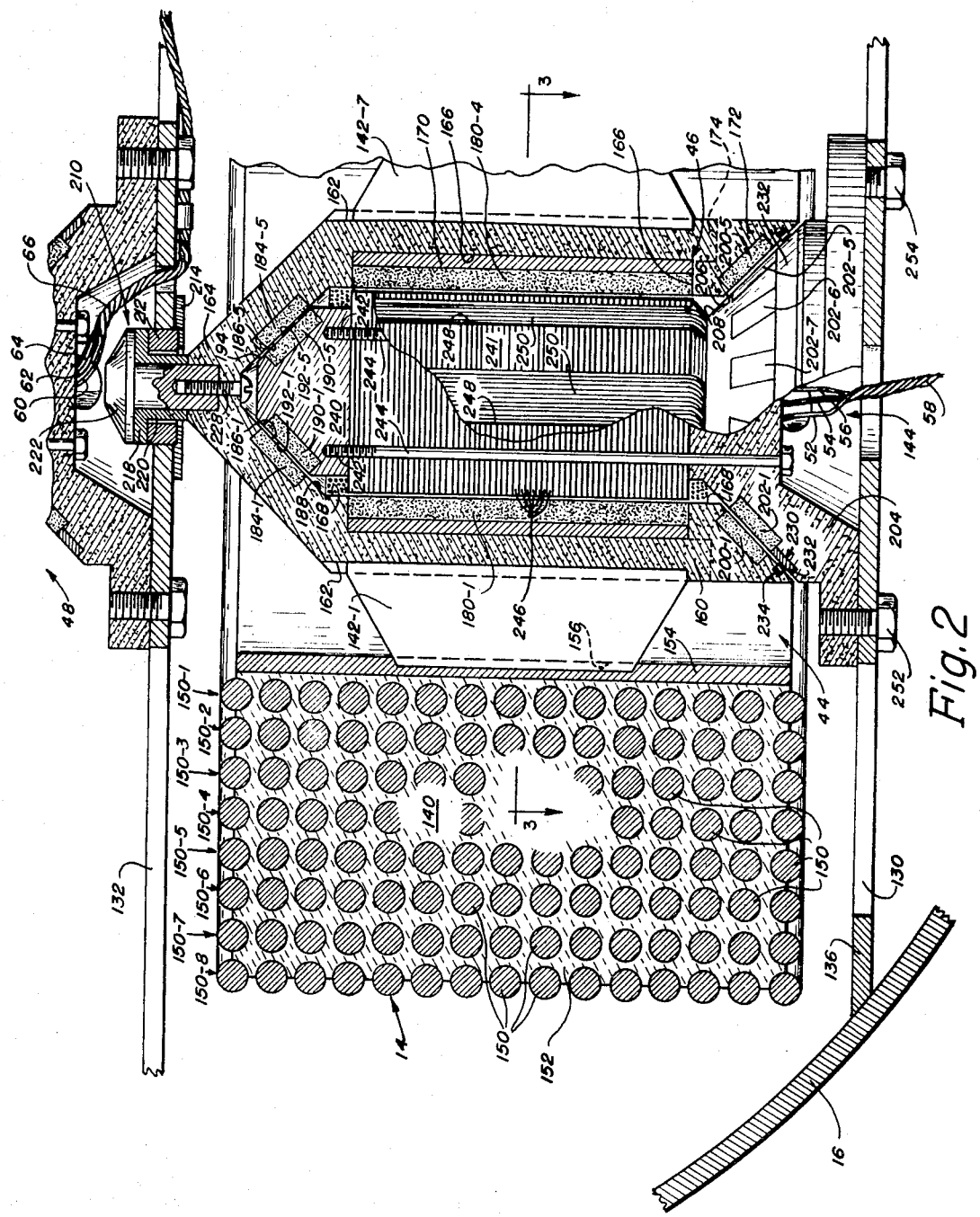
FIG. 2 is a sectional view in elevation of an inertial energy storage rotor embodying certain characteristic features of the present invention.
Figure 3:
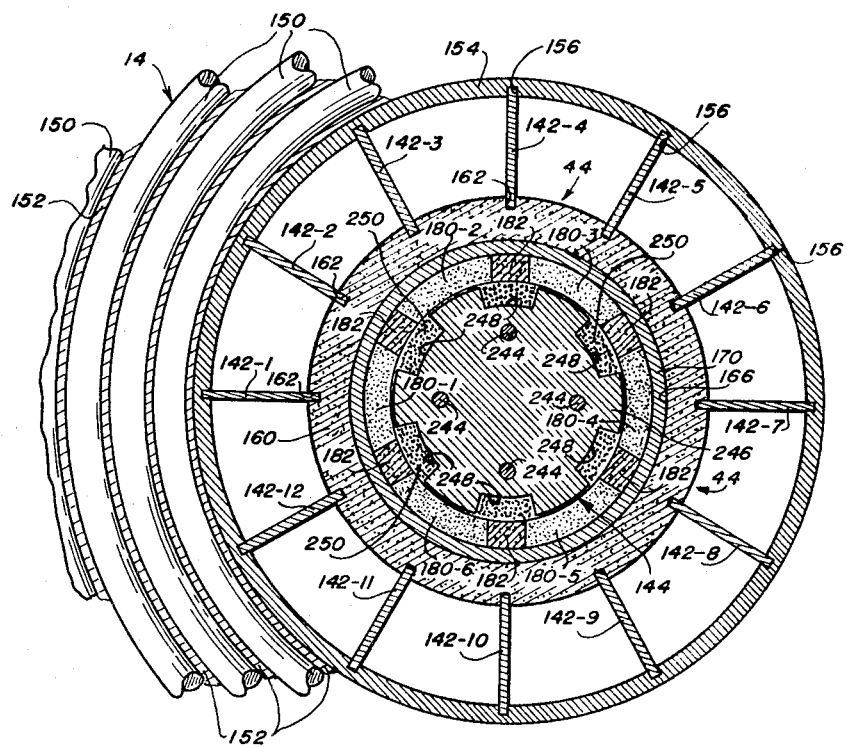
FIG. 3 is a sectional view of the structure shown in FIG. 2, taken along line 3—3.

Referring now to the drawings, there is shown in FIGS. 1, 2, and 3, taken together, an inertial energy storage unit or module embodying the present invention.

The particular inertial energy storage module 10 which is shown in FIGS. 1, 2, and 3 comprises two inertial energy storage rotors 12, 14 mounted in an evacuated, generally spherical shell 16. As shown in FIG. 1, evacuated shell 16 is disposed in a liquid-filled tank 18. It is to be understood, however, that the use of a single rotor of the type claimed in the appended claims falls within the scope of the present invention.

In order to minimize windage losses, reduce rotor deterioration due to chemical attack, and facilitate energy absorption in the event of rotor failure, spherical shell 16 may be evacuated to about $10^{-3}$ to $10^{-5}$ Torr.

In order to provide protection in the event that the rotors 12, 14 are inadvertently operated at rotary speeds greater than their maximum safe speed, and one or both of them rupture, tank 18 is filled with a viscous, high-density liquid 20, such as ethylene glycol. A suitable expansion chamber of the type used, for example, in liquid-filled marine magnetic compasses may be provided in a wall of tank 18 to compensate for the thermal expansion of liquid 20.

As an additional safety feature, liquid 20 may be filled, to the extent that it becomes a slurry, with small particles 22 of porous, highly crushable material, whereby the energy of the centrifugally-propelled particles of a ruptured rotor may be absorbed.

A suitable material from which crushable particles 22 may be fabricated is that material known as polyurethane foam, which may be provided with a suitable protective coating.

Other safety features incorporated in the particular inertial energy storage module of FIGS. 1, 2, and 3 will be described hereinafter.

Tank 18 may comprise a single casting or weldment 24 consisting principally of four walls which extend perpendicular to the plane of FIG. 1 and are joined along their edges which extend perpendicular to the plane of FIG. 1. The walls of casting or weldment 24 may be provided with stiffening ribs 26. Further, casting or weldment 24 may be provided at its opposite, open ends with suitable flanges 28, 30 by means of which cover plates 32, 34 may be liquid-tightly affixed to casting or weldment 24. The endplates 32, 34 may be provided with stiffening ribs 36. The cover plates 32, 34 may suitably be affixed to the flanges 28, 30 of casting or weldment 24 by bolts 38 and studs 40, in which event it will be desirable to provide suitable gaskets 42.

As may be seen in FIGS. 2 and 3, the hub 44 of rotor 14 has embedded in it the permanent magnet field structure of a six-pole alternator-motor. This alternator-motor is generally designated by the reference numeral 46. The rotor assembly which comprises rotor 12 and the spindle on which it is journalled is substantially identical to the rotor assembly which comprises rotor 14 and the spindle on which it is journalled. The hub 48 of rotor 12 incorporates the permanent magnet field structure of a six-pole alternator-motor 50 (not shown), which is substantially identical to alternator-motor 46. The electrical power generated by alternator-motor 46 is produced on three leads 52, 54, 56 which, when suitably cabled, are collectively designated by the reference numeral 58. The electrical power generated by alternator-motor 50 is produced on three leads 60, 62, 64 which, when suitably cabled, are collectively designated by the reference numeral 66. Cable 66 is affixed to the support means which support the adjacent ends of the hubs 44, 48, and to the wall of shell 16, by means of suitable clips 68. Leads 52, 54, 56, 60, 62, and 64 pass through the wall of shell 16 via vacuum-tight hermetic sealing means 70. Leads 52, 54, 56, 60, 62, 64 pass through the wall of tank 18 via liquid-tight sealing means 72. As shown in FIG. 1, free bights or hairpin-loops of leads 52, 54, 56, 60, 62, and 64 are provided between sealing means 70 and sealing means 72. These free portions of leads 52, 54, 56, 60, 62, and 64 are provided in order to accommodate motion of shell 16 with respect to tank 18, as will now be explained.

Motion of shell 16 with respect to tank 18 is damped by liquid 20. The density of liquid 20 is so chosen that shell 16 and its contents have a slightly negative buoyancy factor with respect to liquid 20. That is to say, liquid 20 is so chosen that in vehicular applications of inertial energy storage module 10 shell 16 and its contents follow accelerations of tank 18 in a damped manner, while, at the same time, shell 16 would lightly rest on the bottom of tank 18 but for the resilient support offered by support cradle 74, which will now be described.

Cradle 74 comprises a plurality of pedestals, only some of which, 76, 78, 80, 82, are shown in the drawings (FIG. 1). These pedestals are affixed to the bottom of tank 18 in a circular array. One of the conically wound coil springs 84, 86, 88, 90, etc., is affixed to the upper end of each pedestal 76, 78, 80, 82, etc. A head, 92, 94, 96, etc., is affixed to the upper end of each of said springs 82, 84, 86, 88, 90, etc. The upper end of each head 92, 94, 96, etc., is provided with a smooth, rounded surface which is adapted to contact and support shell 16 without damaging it. A single, elongated coil spring 98 passes through suitable bores in all of said heads 92, 94, 96, etc., and resiliently maintains them against outward, spreading movement in response to the small downward force exerted by shell 16 and its contents. Spring 98 is of sufficient length, and its ends are so joined, that it normally exhibits a circular configuration, and thus does not contact the wall of shell 16. Shell 16, then, normally rests in cradle 74, upon heads 92, 94, 96, etc., and its movement in response to accelerations of tank 18 (in vehicular applications of the inertial energy storage module) is damped by liquid 20.

Shell 16 is further resiliently maintained in its position within tank 18 by means of four sets of permanent magnets, 100, 102, 104, 106, 108, 110, 112, etc. each set consisting of five magnets. A single permanent magnet (e.g., 112) is affixed to the interior of each vertical wall of tank 18. Four permanent magnets affixed to the outside of shell 16 cooperate with each one of the permanent magnets which is affixed to a wall of tank 18. Thus, as shown in FIG. 1, the four permanent magnets 104, 106, 108, 110 (108 and 110 being concealed behind 104 and 106, respectively in FIG. 1) together cooperate with permanent magnet 112, which is affixed to the right-hand, vertical wall of tank 18, right-hand, shown in FIG. 1. The outer ends of all of the permanent magnets 100, 102, 104, 106, 108, 110, 112, etc., i.e., the ends remote from the ends of these magnets which are affixed to a wall of tank, 18, or to shell 16, are of the same magnetic polarity. For example, the outer ends of all of the permanent magnets 100, 102, 104, 106, 108, 110, 112, etc., may be South poles. Further, the magnets of each set of four affixed to the outer surface of shell 16, e.g., 104, 106, 108, 110, are normally equidistant from their associated magnet which is affixed to a wall of tank 18, e.g., magnet 112. Thus, any force tending to displace shell 16 from its normal position will be opposed by forces produced by the above-described sets of four permanent magnets, each set cooperating with its associated one permanent magnet affixed to a wall of tank 18. For example, any tendency of shell 16 to rotate about its vertical axis in a clockwise direction (looking down from the top of FIG. 1) will be opposed by repulsion forces between magnets 108 and 110 and magnet 112, as well as by similar repulsion forces produced by the magnets affixed to the three other vertical walls of tank 18 and two each of their associated sets of four permanent magnets. The magnetic positioning arrangement just described also produces forces opposing the upward displacement of shell 16 in tank 18, and opposing the tilting of the vertical axis of shell 16 with respect to the horizontal walls of tank 18. Alternatively, each of the sets of five coacting magnets may be replaced with a coil spring extending from the tank wall to the nearest point of the shell.

A plurality of pins 114, 116, etc., are affixed to the outer surface of shell 16 in a horizontal circular array. These pins 114, 116, etc., serve to prevent extreme angular excursions of shell 16, in vehicular applications of the inertial energy storage module, by engaging spring 98 or heads 92, 94, 96, etc.

Additional protection in the event of rupture of rotor 12 or 14 may be provide by affixing a ring-shaped band 118 of suitable material to the inside of tank 18, as shown in FIG. 1. Such a material may be made, for instance, from continuous rovings of carbonized filamentary material bonded into a unitary mass with epoxy cement. When such a band 118 of carbon-epoxy material, or the like, is used, it is desirable to affix the outer positioning magnets 112, etc., to straps 120, the ends of which are affixed to the vertical walls of tank 18 immediately outside the wall area covered by band 118, as shown in FIG. 1. By this means it is possible to avoid breaks in the carbon filament rovings, while at the same time supporting band 118 in its operative position.

Provision of band 118 in ring-shaped form (i.e., of circular crosstsection) permits damping liquid 20 to contact the metal walls of tank 18 over maximum area for maximum heat transfer. If band 118 were of square cross-section, and contacted the vertical walls of tank 18 throughout its outer surface, considerable heat transfer surface would thereby be lost.

Considering now the apparatus disposed within shell 16, it may be seen from FIG. 1 that the principal content of shell 16 is the two inertial energy storage rotors 12, 14.

The rotor assemblies which include the rotors 12 and 14 are supported within shell 16 by three spiders 130, 132, 134, only two of which, viz., 130 and 132, are shown in the drawings. (Spider 134 is located above rotor 12 in the upper portion of shell 16, and supports the upper end of rotor 12.)

Spiders 130, 132, 134 may be directly affixed to the inner surface of shell 16, as by butt welding, brazing, or any other joining method which produces a joint of good thermal conductivity, and may include outer rings, such as indicated by the reference numeral 136 in FIGS. 1 and 2, in order to provide stress distribution and increase the flow of heat from the spiders into shell 16. The lower ring, 136, if such rings are employed, may be provided with a suitable opening at one place on its periphery to accommodate cable 66.

Referring now to FIGS. 2 and 3, the construction of the rotor assembly which includes lower rotor 14 will be described in detail, it being understood that the rotor assembly which includes upper rotor 12 is substantially identical in construction to the rotor assembly which includes lower rotor 14.

Rotor 14 comprises a rim or felly 140, a plurality of spokes 142—1 through 142—12, and a hub 44. Hub 44 is journalled upon a spindle assembly, or spindle, 144 (FIG. 2).

Felly 140 is comprised of a plurality of rings 150 of materials selected in accordance with the principles of the present invention, as will be more fully set forth hereinafter.

In accordance with a preferred embodiment of the present invention, the rings 150 are disposed in a plurality of cylindrical shells, designated by the reference numerals 150—1 through 150—8 in FIG. 2. As may be seen in FIG. 2, each of the cylindrical shells 150—1 through 150—8 of rings 150 consists of 15 rings 150. The felly 140 of the embodiment of the present invention shown in FIGS. 1, 2, and 3, then, comprises 120 rings, each of which is designated by the reference numeral 150, these 120 rings 150 being disposed in eight concentric cylindrical shells 150—1 through 150—8. It is to be understood, however, that the present invention is not limited to the employment of one hundred and twenty rings, nor to the employment of rings arranged in concentric cylindrical shells, nor to the employment of shells having equal numbers of rings. In some embodiments the number of rings may exceed one thousand, for example. It is to be further understood that the present invention is not limited to the employment of rings taking the form known as "anchor rings", as shown in the present drawings, having circular cross-section, but also embraces constructions in which the rings are of any toroidal configuration. In some cases, for instance, each shell may be a single thin ring of considerable axial extent. The term "thin ring" as used herein means any ring whose radial thickness is sufficiently small in relation to its mean radius so that the action of centrifugal force produces substantially only pure hoop stresses, all other types of stress being negligible by comparison.

The rings 150 of felly 140 are embedded in a matrix 152 of low vapor pressure elastic material, such as silicone rubber. (Other elastic matrix arrangements embodying particular aspects of the present invention are shown and described in detail hereinbelow.)

Figure 6:
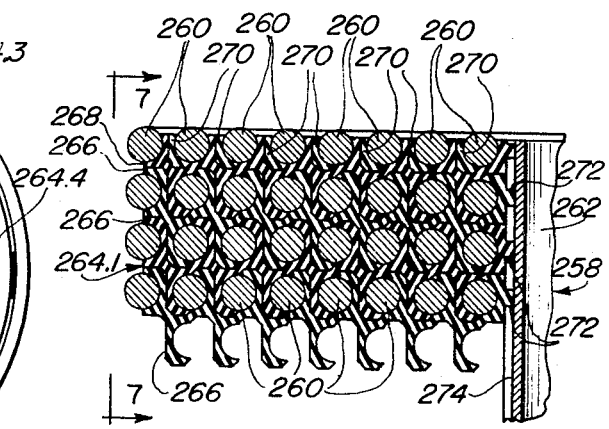
Figure 6A:
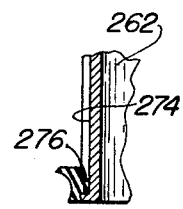

The matrix 152 itself may be affixed to a cylindrical core 154, as by cementing, or by a pin-and-slot arrangement analogous to that shown in FIGS. 6 and 6A of the present drawings. Core 154 may be provided with a plurality of slots 156 which are adapted to receive the outer ends of the spokes, 142—1 through 142—12.

As may be seen by comparison of FIGS. 2 and 3, spokes 142—1 through 142—12 may 142—made of sheet material, e.g., sheet aluminum, and may be of light construction.

As shown in FIG. 2, it is desirable to taper the thin, fin-like spokes 142—1 through 142—12 outwardly in order to reduce the radial stresses therein to a tolerable level. This taper may, for instance, vary inversely with the square of the radius, whereby the radial stress produced by centrifugal force is substantially reduced relative to the stress which would occur at the same radius in a non-tapered spoke. Since spokes 142—1 through 142—12 function only to (a) support the felly 140 in its operative position relative to hub 44 and (b) transmit the relatively weak torques required during power output from and power input to the felly 140, they may be made of very thin material, if this is found to be desirable in a particular design. Only relatively weak torques are transmitted by spokes 142—1 through 142—12 because of the high speeds of rotation at which the rotors of the devices of the invention are intended to operate; e.g., speeds in the range of about 500 revolutions per second to 2,500 revolutions per second.

Certain inventive improvements in particular parts of the inertial energy storage module of the present invention may be found in the copending U.S. Pat. Application Ser. No. 68,959 of Stephen F. Post, entitled INERTIAL ENERGY STORAGE APPARATUS, which was filed on Sept. 2, 1970.

Hub 44 comprises a body 160 of high-strength material such as carbon fiber-epoxy composite (see, "Carbon Fiber Composites for Aerospace Structures," A. C. Ham, *Physics Bulletin*, (British), Vol. 20, p. 444, 1969; Popular Science magazine, February, 1969) which is of generally cylindrical configuration, and is provided on its outer surface with a plurality of slots 162, each one of said slots 162 being adapted to supportingly receive the inner end of one of the spokes 142—1 through 142—12. As seen in FIG. 2, hub body 160 is provided at its upper end with an integral, generally conical cap member 164, the function of which will hereinafter be explained in detail.

A cylindrical cavity 166 is provided in the inner face 168 of hub body 160. At the bottom of cavity 166, i.e., the part of cavity 166 most remote from the axis of hub 44, there is disposed a cylindrical magnetic shunt 170, which may be fabricated from magnetically soft iron, or may be fabricated from magnetic steel laminae in order to reduce iron losses. In order to emplace shunt 170 in cavity 166 the lower or skirt portion 172 of hub body 160 may be formed separately from the main cylindrical portion of hub body 160. When such a mode of construction is adopted, magnetic shunt 170 may be inserted into cavity 166 in a direction parallel to the axis of hub body 160, whereafter skirt member 172 my be joined to the main portion of hub body 160 along the seam indicated by the dashed lines 174 in FIG. 2. Alternatively, hub body 160, including an integral skirt 172, may be cast or molded around magnetic shunt 170. In either event, i.e., whether hub body 160 is of one-piece or two-piece construction, the part of hub body 160 extending below cavity 166, as seen in FIG. 2, will sometimes hereinafter be called the "skirt".

Also contained in cavity 166 are the permanent magnet field poles 180-1 through 180—6 of alternator-motor 46. As shown in FIG. 3, intermediate bodies 182 may be disposed between poles 180—1 through 180—6, and these intermediate bodies may be composed of the same material from which hub body 160 is formed. Poles 180—1 through 180—6 may be bolted or socketed to magnetic shunt 170, in the conventional manner, and the intermediate bodies 182 may be made integral with the main portion of hub body 160 by extending through suitable openings in the magnetic shunt 170.

As may be seen in FIG. 2, permanent magnets 184—1 and 184—5 are embedded in the inner face of the conical cap portion 164 of hub body 160. The inner faces 186—1 and 186—5 of said permanent magnets 184—1 and 184—5 are flush with the inner surface 188 of conical cap portion 164, and are contoured to match the contour of said inner surface 188. Eight additional permanent magnets of the same kind, 184—2 through 184—4 and 184—6 through 184—10, are also embedded in and contoured to match the contour of the inner surface 188 of the conical cap portion of hub body 160. The permanent magnets 184—1 through 184—10 are equiangularly spaced about the axis of hub body 160, their corresponding corners lying on circles whose planes are perpendicular to the axis of hub body 160. The inner surfaces 186—1 through 186—10 of the permanent magnets 184—1 through 184—10 are all flush with the conical inner surface 188 of the cap portion 164 of hub body 160.

In accordance with a principal feature of the present invention, the permanent magnets 184—1 through 184—10 cooperate with a corresponding plurality of permanent magnets 190—1 through 190—10 (FIG. 2) to act as a periodic magnetic bearing for the purpose of rotatably supporting rotor 14 for rotation about its spindle 144, the outer surface 192—1 through 192—10 of these permanent magnets being flush with the outer surface 194 of the generally conical upper end of spindle 144. The permanent magnets 190—1 through 190—10 are equiangularly spaced about the axis of spindle 144, their corresponding corners lying on circles whose planes are perpendicular to the axis of spindle 144.

A second periodic magnetic bearing, employed in accordance with the present invention for the same purpose as the above-described periodic magnetic bearing, is comprised of a plurality of permanent magnets 200—1 through 200—10, embedded in the skirt 172 of hub body 160, which cooperate with a corresponding plurality of permanent magnets 202—1 through 202—10 embedded in the base 204 of spindle 144. The exposed faces of the permanent magnets 200—1 through 200—10 are flush with the inner surface 206 of skirt 172, and are contoured to match the contour of inner surface 206 of skirt 172. Similarly, the exposed faces of the permanent magnets 202—1 through 202—10 are flush with the conical outer surface 208 of base 204, and are contoured to match the contour of conical outer surface 208 of base 204.

In the preferred embodiment of the present invention shown in FIGS. 1 through 3 the adjacent, contoured faces, 186—1 through 186—10 and 192—1 through 192—10, of all of the upper bearing magnets, 184—1 through 184—3 and 190—1 through 190—3, are all of the same magnetic polarity. The adjacent, contoured faces of all of the lower bearing magnets, 200—1 through 200—10 and 202—1 through 202—10, are all of the same magnetic polarity. The provision of suitable bearing magnets, 184—1 through 184—10, 190—1 through 190—10, 200—1 through 200—10, and 202—1 through 202—10, is within the scope of one having ordinary skill in the art. If, for example, the total weight of rotor 14 (including hub 160, spokes 142, field magnets 180, and bearing magnets 184, 200) is approximately 20 kilograms, and further assuming that the total area of the bearing magnets 184, 200 as projected upon a horizontal plane is 20 square centimeters, it follows that the required field strength of the bearing magnets would be about 5,000 Gauss, such field strengths being commonly achieved by workers in the permanent magnet design and fabrication arts. Design variations, such as increasing the width of the lower bearing magnets to reduce necessary magnetic field strength or to provide additional rotor supporting force will be obvious to those having ordinary skill in the art. Also, it will be obvious to those having ordinary skill in the art that when employing certain types of permanent magnets, for reasons of economy, manufacturing convenience, or otherwise, it will be desirable to provide magnetic shunt rings in order to afford low reluctance magnetic return paths. Such magnetic shunt rings may suitably take the form of frustums of cones of such altitude, apex angle, and radii as to adapted to contact the faces of all of the bearing magnets of a set (e.g., 184) remote from the active faces thereof (e.g., 186). Thus, a magnetic shunt ring 185 (not shown) may be provided by one having ordinary skill in the art which is adapted to be embedded in cap 164 and to closely contact all of the large faces of the bearing magnets 184 which are themselves embedded within cap 164. These large back faces of the bearing magnets 184 may themselves be contoured to more closely contact the inner surface of the said magnetic shunt ring 185. Similar magnetic shunt rings may be provided for similar cooperation with the other three sets of bearing magnets 190, 200, 202. In some embodiments the adjacent bearing magnets of each set may be of alternate magnetic polarity. Periodic magnetic bearings have the property that they provide stable centering forces at angular speeds above a minimum critical speed which is determined by the construction and arrangement of the bearing magnets and their pole faces. The minimum critical angular speeds for stable centering operation of the general type of periodic magnetic bearing shown and described herein, given the requisite field strength discussed immediately above, will be of the order of tens of revolutions per second or less, which is but a small fraction of the intended operating speed of the rotors of the present invention. In certain preferred embodiments of the present invention, as explained hereinafter in connection with FIG. 12, means are provided whereby the rotors of the inertial energy storage modules employed in those embodiments are never operated at speeds as low as the minimum critical speeds of their periodic magnetic bearings, after being initially brought up to speed.

In addition to the abovesaid periodic magnetic bearings by which rotor 14 is supported during operation of the inertial energy storage module, upper and lower frictional snubber bearings are provided to rotatably support rotor 14 when it is stationary or rotating at very low speeds prior to attaining sufficient rotational speed to cause the periodic magnetic bearings to become fully effective. The snubber bearings also act transiently to limit displacement of the rotors when the module is sharply accelerated, as in vehicular applications.

The upper snubber bearing 210 is comprised of a suitable self-lubricating bushing 212, formed, e.g., of Teflon, which closely fits in an opening in the central portion of spider 132, and is maintained in position by a disk 214, which is itself affixed to the lower surface of spider 132. The outwardly projecting flange 218 of a generally cylindrical member 220 bears upon the upper surface of bushing 212, the cylindrical member 220 being itself affixed to the conical upper end 164 of hub body 160 by a retainer 222 and a co-operating screw 228.

The lower snubber bearing 230 is comprised of a metal track member 232 which is embedded in the generally conical upper surface of base member 204, and is flush with the surface thereof. The other major member of lower snubber bearing 230 is the ring-like track member 234 which is embedded in the conical inner surface of skirt 172. Circular track 232, may, for instance, be composed of a heat resistant metal, while track member 234 may be composed, for instance, of a sinter metal impregnated with a lubricant such as molybdenum disulphide which will operate as a lubricant without substantially impairing the vacuum maintained in shell 16. Since rotor 14 is very rapidly brought into its high operating speed range (e.g., 500 to 2,500 revolutions per second) by means of the motor action of alternator-motor 46, it will be realized by those having ordinary skill in the art, from FIG. 2, that track 232 contacts track 234 only intermittently, during a very brief operating period, i.e., during the bringing of the rotor 14 into its range of operating speeds, and that, thus, despite the relatively large diameter of tracks 232 and 234 they can be fabricated in such a way as to have suitably extended life under the operating conditions imposed by the operation of the inertial energy storage module shown and described herein.

The construction of spindle 144 will now be described, in connection with FIGS. 2 and 3.

Spindle 144 comprises base 204, cap 240, and the stator portion 241 of alternator-motor 46. Base 204 and cap 240 may be formed from the same material from which hub body 160 is formed, in the same manner.

As pointed out hereinabove, the permanent magnets 190—1 through 190—10 of the upper periodic magnetic bearing are embedded in cap 240, with their exposed surfaces flush with the conical outer surface 194 of cap 240. Cap 240 is also provided with a plurality of tapped holes 242 which are adapted to receive and retain the threaded ends of elongated bolts 244 (FIG. 2). Bolts 244 first pass through holes in base 204 and then through holes in the magnetic steel laminations 246 before being engaged with the tapped threads in holes 242 in cap 240. In the event that the material of cap 240 is unable to sustain threads of sufficient strength, it will be realized by those having ordinary skill in the art that suitable bushings may, instead, be molded into cap 240, and those bushings provided with suitable tapped holes for coaction with the threaded ends of said bolts 244. Thus, it may be seen that spindle 242 is comprised of base 204, a stack of magnetic steel laminations 246, and cap 240, joined together by means of elongated bolts 244.

In order to promote heat dissipation, the bolts 244 may be fabricated from material characterized by good thermal conductivity. In addition, to further promote thermal conductivity a "dish" of conductive material may be provided which closely fits within the cavity in the bottom of base 204, and is provided with apertures for receiving the shanks of the bolts 244 and the cables 52, 54, 56, and is also provided with a planar flange adapted to be trapped between the bottom of the base 204 and the spider 130 for good thermal contact with spider 130, and thus good heat transfer from the bolts 244 to the spider 130. A similar dish may also be provided in the cavity of the base on which rotor 12 is mounted.

As may be seen in FIG. 3, the laminations 246 are so configured as to define, when joined in stacked relation, six vertical slots 248. A plurality of windings 250 are disposed in slots 248, said windings being so arranged, and so interconnected with leads 52, 54, and 56, as to produce three-phase alternating potentials upon leads 52, 54, and 56 when excited by the periodic changes in linking magnetic flux occasioned by the rotation of rotor 14 about spindle 144. The design and arrangement of such alternator windings, laminations, field structures, etc., is well-known to those having ordinary skill in the electrical machine design art, and thus will not be described in detail herein. For example, it will be clear to those having ordinary skill in the art that the inner faces of the permanent magnet poles 180 are of alternate magnetic polarity. The corresponding stator windings of alternator-motor 50 are so arranged that rotor 12 will contrarotate with respect to rotor 14 when the same three-phase charging voltages are applied to leads 52, 54, 56 and 60, 62, 64.

As may be seen in FIG. 2, base 204 is affixed to the central portion of spider 130 by means of suitable bolts 252, 254, which are represented only generally in the drawings, the provision of suitable fasteners, and the like, being within the scope of one having ordinary skill in the art without the exercise of invention, for which reason such fasteners, and the like, will not be described in detail herein.

The device of the present drawings is well adapted for mobile uses such as the supplying of power to propel private passenger automobiles, taxis, rapid transit trains, and the like, as well as to stationary applications.

The alternator-motors in the hubs of rotors 12 and 14 may be alternatively wired for other operating frequencies, or for N-Phase operation where N is other than 3, without the exercise of invention.

In accordance with a principal feature of the present invention, the rotor rings are fabricated from materials characterized by values of the modulus $U_0$ exceeding $3 \times 10^9$ ergs per gram (300 Joules per gram), where:

$$U_0 = K/2\rho,$$

$K$ is the maximum tensile strength of a particular material in dynes per square centimeter, and $\rho$ is the density of that material in grams per cubic centimeter.

The preferred rotor ring materials according to the present invention have the common property that they are substantially non-setting. That is to say, specimens of these materials which have been loaded in tension by any force less than that which causes rupture of the specimen will substantially return to their original lengths when the load is removed. Put differently, the preferred rotor ring materials according to the present invention are materials which do not sustain a substantial permanent set when loaded to any extent short of breaking load. Such materials generally exhibit highly superior resistance to failure from mechanical fatigue, as compared to metals or other ductile materials.

Figure 4:
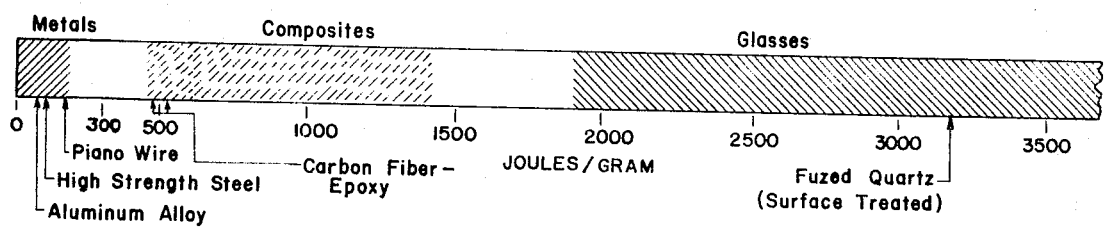
FIG. 4 is a bar chart comparing the values of rotational energy capacity per unit mass, $U_O$, of rotor ring materials of the present invention with those of conventional flywheel materials.

As schematically illustrated in FIG. 4, there are at least two general groups of materials having moduli $U_0$ which exceed 300 Joules per gram. The preferred one of these two groups of materials is designated "Glasses" in FIG. 4. The term "glasses" as used herein to denote the materials of said preferred group includes not only the specific example given in FIG. 4, i.e., fused quartz, but also other glasses, and combinations of glasses (e.g., the combinations of glasses set out in Table I of the copending U.S. Patent Application Ser. No. 68,959 of Stephen F. Post). The words "glass" and "glasses" are used herein in their broadest acceptation, as including, but not limited to, quartz glass, flint glass, lime-soda glass, crown glass, boro-silicate glass, fused quartz, and, in general, any tensilely isotropic substance the modulus $U_0$ of which exceeds 300 Joules per gram.

It is to be understood, then, that a particular feature of the present invention is the employment of continuous rings of such glasses in the fellies of inertial energy storage rotors.

As may be seen from FIG. 4, the moduli $U_0$ of such glasses are typically as much as 10 to 15 times as great as the moduli $U_0$ of the hitherto principally employed flywheel materials, e.g., steel. The magnitude of the benefit to be derived by taking advantage of this very great increase in modulus $U_0$ in accordance with the principles of the present invention can only be fully appreciated by reference to a specific example.

By way of such an example, let it be assumed that a passenger automobile especially designed to be powered by an inertia-electric propulsion system weighs about 2,000 pounds loaded and requires inertial energy storage apparatus capable of storing $10^8$ Joules of energy.

The $10^8$ Joule energy requirement of this inertia electric passenger automobile could, for instance, be stored in four inertial energy storage rotors of the present invention, each rotor having a quartz ring felly (packing fraction 0.75) of outer diameter 35 centimeters, inner diameter 10 centimeters, axial length 17 centimeters, weight 55 pounds and maximum rotational speed 1,800 revolutions per second. These four rotors would preferably be mounted in two inertial energy storage modules of the kind shown and described hereinabove, occupying a total volume of approximately 2 by 2 by 4 feet. The total felly weight would be approximately 220 pounds, sufficiently small so that the total weight of the two inertial energy storage modules can be made less than the 400 to 500 pounds which is the combined weight of the engine and gasoline in a present-day gasoline-powered automobile.

The great superiority of the tensilely isotropic ring material embodiments of the inertial energy storage apparatus of the present invention as a source of vehicular propulsion power may now be seen by comparing the above-described two-module energy source for a prototype inertia electric passenger automobile with prior art flywheels and storage batteries.

If, for example, aluminum alloy flywheels were to be considered for use as the energy source for the above-described prototype inertia-electric passenger automobile, the plan would probably be abandoned after the making of some preliminary calculations, since such calculations would show that the aluminum alloy rotors for the prototype inertia-electric passenger automobile would have to weigh about 2,500 pounds; which is more than the assumed loaded weight of the entire automobile, thus negating the original assumption as to the required energy storage capacity to produce the desired range.

It may further be simply deduced from said preliminary calculations and FIG. 1 of the present specification that in order to provide equal protection in the event of rotor failure as compared with the inertial energy storage modules of the present invention the above-described aluminum alloy rotors would have to be mounted in modules the total volume of which would be about 625 cubic feet. Obviously, then, the use of conventional aluminum alloy rotors as inertial energy storage means for the propelling of other than short range passenger vehicles would be totally infeasible, both on weight considerations and on volume considerations. This conclusion is not altered if high strength steel is substituted for aluminum alloy.

By contrast, as pointed out hereinabove, the requisite inertial energy storage modules of the present invention necessary to propel the above-postulated prototype inertia-electric passenger automobile would compare equally or favorably with present gasoline power plants (including their associated transmissions and fuel tanks), both as to weight and volume.

Going now to a comparison of the inertial energy storage apparatus of the present invention with storage batteries, as energy sources for vehicular propulsion, preliminary analysis would result in the elimination of nickel-cadmium storage batteries, because of their cost and their well-known low-charge-discharge efficiency, i.e., about 50 to 60 percent.

Further analysis would show the lead-acid storage battery to have the most desirable overall characteristics of presently available batteries for use as an energy source for vehicular propulsion. (This conclusion is borne out, for instance, in the literature describing the recent (1970) transcontinental Clean Air Car Race, in which most of the electrical entries were powered by lead-acid storage batteries.) As is well-known, the energy storage capacity of the lead-acid storage battery per unit mass is approximately 100 Joules per gram. The assumed energy storage requirement of the above-postulated prototype inertia-electric passenger automobile was $10^8$ Joules, and thus it can be shown by simple calculation that the number of lead-acid storage batteries necessary to satisfy the assumed energy requirements of the said proto-type passenger automobile would weigh approximately 2,200 pounds, again negating the original assumptions as to weight, range and energy demand.

It follows that not only are the inertial energy storage apparatus of the present invention greatly superior to presently available storage batteries, but that because of weight, volume and charge-discharge efficiency considerations presently available storage batteries are essentially infeasible for use as energy sources in the operation of ordinary passenger automobiles, whereas certain preferred embodiments of the inertial energy storage apparatus of the present invention are equally if not favorably comparable to present day gasoline engine propulsion systems.

While the above comparison between the inertial energy storage apparatus of the present invention and the most frequently considered prior art energy storage means for non-polluting vehicular propulsion was based upon the preferred isotropic ("glass") material rotor embodiments of the present invention, it is also to be understood that certain anisotropic (composite) material ring embodiments of the present invention are superior to storage batteries as non-polluting vehicular propulsion energy sources, particularly those embodying inventions of Stephen F. Post (see co-pending U.S. Pat. Application Ser. No. 68,959).

For example, an anisotropic ring inertial energy storage module embodying the most advantageous teachings of the present specification and of the co-pending U.S. Pat. Applications of Stephen F. Post might, typically, conform to the following parameters. Number of rotors: 2. Outside diameter of each rotor: 50 centimeters. Inside diameter of each rotor: 20 centimeters. Axial length of each rotor: 40 centimeters. Total weight of rotors: 350 pounds. Overall dimensions of the module: 3 feet by 3 feet by 3 feet. Examples of suitable materials from which the rings of the rotors of such modules can be made are disclosed and discussed at pages 98 through 100, and 202, of the February, 1969, edition of Popular Science magazine in an article by Dr. Wernher von Braun entitled "*Lighter Than Aluminum . . . Stronger Than Steel*".

Two of the inertial energy storage modules described in the previous paragraph can be expected to, typically, store $10^8$ Joules of energy, and to propel an optimally designed four passenger automobile (curb weight about 2,500 pounds, including the two modules) about 160 miles. By contrast, a well-designed four passenger storage battery powered vehicle having a range of 125 miles under optimum conditions (fixed throttle at 55 to 60 miles per hour) can be expected to have a curb weight of 5,300 pounds.

The advantages of the inertial energy storage devices and systems of the present invention cannot, however, be fully appreciated by comparing the present invention with prior art energy storage means used for non-polluting vehicle propulsion. To fully appreciate the advantages of the present invention one must also consider the economies in national energy reserves and the individual vehicle owner's operating costs which could be achieved if the present invention were to be generally adopted for highway transportation.

At the present time the fuel consumption of approximately 100,000,000 motor vehicles operating in the United States amounts to about 2 billion barrels per year, or about 800 gallons of gasoline per automobile per year. The total combustion energy content of this annual gasoline consumption is about $10^{19}$ Joules (assuming $2 \times 10^7$ Joules per pound as the energy released in the combustion of gasoline).

By contrast, it can be conservatively estimated that the same number of vehicles, optimally designed to utilize the system of the present invention with its very high bilateral conversion efficiencies, would require only about $5 \times 10^{17}$ Joules of energy, thereby reducing the national annual energy consumption for highway transportation by a factor of 20.

By calculation, $5 \times 10^{17}$ Joules is approximately 150 billion kilowatt hours. 150 billion kilowatt hours is 10 percent of the annual electrical power production of the United States. Therefore, it can be assumed that the power required annually to charge the inertial energy storage modules of these vehicles could readily be supplied by the existing electrical power industry of the United States, particularly since much of this demand could be supplied during off-peak hours (i.e., by charging the great majority of these vehicles overnight).

Conservatively estimating the cost of electricity for charging these vehicles at 2 cents per kilowatt hour, the cost per mile (for energy) of operating one of these vehicles at 60 miles per hour would be about 0.3 , as contrasted with a cost of about 3  per mile for fuel for a present day, gasoline-powered automobile. efficiency In summary, then, it can be seen that the consequences of widespread adoption throughout the United States of highway vehicles utilizing the present invention could be, inter alia, to markedly reduce both the drain on the national energy reserves and the operating cost (for energy) of highway vehicles.

When, in accordance with the teachings of the present invention, optimum specimens of the inertial energy storage modules of the present invention are employed in conjunction with solid state cycloconverters (which are, typically, 99 per cent efficient), the resulting vehicular propulsion systems can be made to approach or achieve the criteria of high energy storage capacity per unit mass and high bilateral conversion efficency necessary for attaining the economies of national energy reserves and vehicle operating expense referred to above.

In accordance with a particular feature of the present invention, the tensile strength K of fused quartz rotor rings (150, FIG. 2) should be increased by suitable surface treatment and subsequent surface protective coating, thereby greatly increasing their rotational energy storage capacity per unit mass, $U_0$.

It has long been known that thin fibers of fused quartz (fused silica) possess a very high tensile strength (typically reported as $0.9 \times 10^{11}$ dynes per square centimeter, i.e., about 1,300,000 per square inch for fibers of 1.5 micron diameter — see Smithsonian Physical Tables, 9th Rev. Ed., page 534, for example).

Until recently it had been thought that this great strength would not be achieveable in fused quartz filaments of substantially larger diameter, or in fused quartz rods.

Recent investigations, however, have shown that surface conditions, i.e., the presence or absence of surface defects, and the presence or absence of absorbed water vapor, play a dominant role in determining the tensile strength of fused quartz specimens (see Procter, Whitney, and Johnson, Proceedings Royal Society A 297, p. 534 (1967)). The probability per unit length of encountering surface defects is less in fine filaments than it is in larger diameter rods, whence the earlier observations of greater strength in thin fibers of fused quartz. In the aforementioned studies of Proctor, et al., it was found that with proper fire polishing (surface melting and heat treatment), and with care to exclude contact with water vapor after such fire polishing, measured tensile strengths up to $1.4 \times 10^{11}$ dynes per square centimeter (2,000,000 pounds per square inch) were achieved, apparently independent of sample diameter.

In order to achieve high values of $U_0$, then, it is a particular feature of the present invention to fabricate rotor rings of fused quartz or like brittle materials, wherein surface effects are controlling in determining tensile strength, by methods including the steps of (1) treating the rings to produce the necessary degree of surface perfection, and (2) providing means for protecting the thus treated ring surfaces to protect them from mechanical damage, contact with water vapor, etc., during subsequent testing an incorporation into rotor assemblies.

By way of example, the following steps constitute a process for the preparation of a fused quartz rotor ring in accordance with the present invention.

1. Prepare ring by casting molten quartz (temperature above about 1,700° C.) in a non-reacting, refractory mold of the kind well-known to those having ordinary skill in the art.

2. Clean surface of ring to remove impurities, e.g., by chemical etching in, say, hydrofluoric acid, or by the action of abrasives.

3. Place ring on horizontal, non-reactive surface (e.g., refractory metal or ceramic), and "flame polish" ring surface by exposure to gas flame. (Alternatively, the necessary heating of the ring surface may be accomplished by thermal radiation or by particle bombardment in a controlled atmosphere or in vacuum.)

4. Leaving ring on said horizontal, non-reactive surface, coat exposed (upper) portion of ring with a thin film of non-reacting material, e.g., platinum, as by sputtering, evaporation in vacuo, or thermochemical deposition. (The coating material selected must possess an adequately high melting point and adequately low vapor pressure at elevated temperatures to prevent its dissipation during subsequent heat treatment of the lower (unexposed) surface of the ring.)

5. Invert ring, so that the remaining uncoated surface is disposed upwardly, the ring remaining on said horizontal, non-reactive surface.

6. Reheat ring, as in step 3 above, to flame polish uncoated portion of ring surface.

7. Coat ring as in step 4 above.

8. Remove ring from said horizontal, non-reactive surface, after cooling.

Figure 4A:
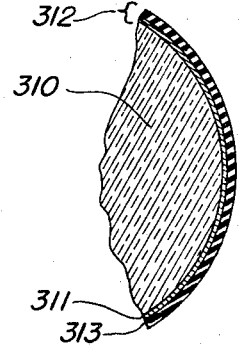
FIG. 4A is a partial cross-sectional view of a particular type of inertial energy storage rotor ring embodying certain features of the present invention.

9. In accordance with the present invention, additional protective coatings, for example, thin layers of resilient plastic or rubber-like materials, may be applied to provide additional surface protection prior to further handling and assembly (FIG. 4A).

While the fabrication of a single rotor ring according to the principles of the present invention has been described immediately above it is to be understood that in producing some inertial energy storage modules of the present invention all of the rotor rings will be fabricated in accordance with the above process. As manufactured by the above process each rotor ring will be characterized by a high value of $U_0$, and may be handled during rotor fabrication and exposed to ambient air without loss of its high $U_0$.

While the rotor ring fabricating method of the invention was described above as applied to a fused quartz ring, it is to be understood that other suitable isotropic materials may be fabricated into rotor rings, treated, and protected in accordance with the same process.

The terms "matrix" and "matrix means" as used herein are in no sense limited to the particular matrix shown and described hereinabove in connection with FIGS. 1 through 3, and there designated by the reference numeral 152.

Rather, the terms "matrix" and "matrix means", and their equivalents "former" and "former means", are used herein in their broadest acceptation, to denote any means which may be employed to maintain the rings of the felly of a rotor of the present invention in their operative juxtaposition, thereby giving form to the rotor felly.

Thus, it will be understood that the terms "matrix", "matrix means", "former", and "former means", as used herein, embrace, in addition to the matrix construction 152 of FIGS. 1 through 3, constructions such as will now be described in connection with FIGS. 5 through 11.

Referring now to FIGS. 5, 6, 6A, and 7, there is shown therein an inertial energy storage rotor felly according to a particular embodiment of the present invention.

The felly 258 of this embodiment comprises a plurality of rotor rings 260, formed from material having high rotational energy capacity per unit mass. $U_0$, in accordance with the principles of the present invention, and a cylindrical core 262.

Figure 5:
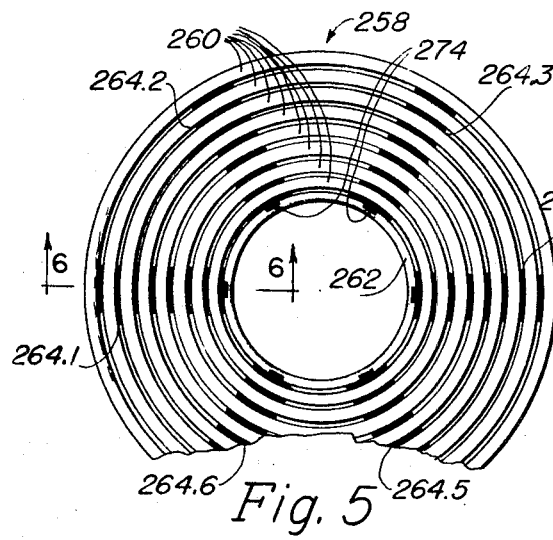
Figure 7:
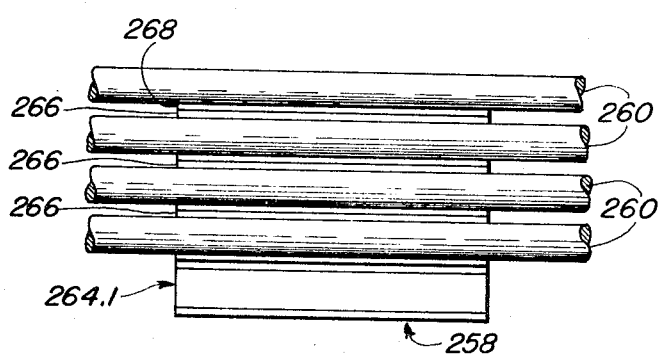

The rotor rings 260 of felly 258 are maintained in operative juxtaposition to each other and to core 262 by means of a matrix 264 consisting of six substantially identical matrix members 264.1 through 264.6, all of which are shown at least in part in FIG. 5. Each matrix member 264 is an assembly of elastic segments which are mutually interengaged and also closely embrace associated ones of the rotor rings 260. Since FIGS. 6 and 7 are partial views only of a 120 ring rotor, a part only of the total number of segments making up matrix member 264.1 are shown in FIGS. 6 and 7.

The majority of the elastic segments making up each matrix member 264.1, 264.2, etc., are of the type designated by the reference numeral 266, the longitudinal cross-section of which is shown in FIG. 6. As may further be seen in FIG. 6, each segment 266 is provided with eight upwardly projecting fingers and seven downwardly projecting fingers. The downwardly projecting fingers and the upwardly projecting fingers are substantially alike in cross-section. As best seen in FIG. 7, each of these fingers extends from a first planar face of its segment 266 to a second planar face of its segment 266, both of which faces are parallel to the plane of FIG. 6. The faces of these fingers extending from said first planar face to said second planar face may, when fabricated, be made slightly curved to adapt to the corresponding curvature of the rotor rings 260 which are to be engaged thereby. Each segment 266 extends from the outer surface of core 262 to one of the largest diameter rings 266, which it partially embraces.

As may best be seen in FIG. 6, however, the uppermost rings 260 of felly 258 are supported in elastic segments 268 and 270, which differ from the aforesaid elastic segments 266. Elastic segment 268 is generally like said elastic segments 266, but for the fact that its upwardly extending fingers are shorter than the corresponding upwardly extending fingers of said segments 266. As seen at the top edge of FIG. 6, the upwardly extending fingers of segment 268 extend only slightly above the plane of the centers of the upper rings 260. Seven separate elastic members 270, formed from the same material as said segments 266 and 268, are provided to fill the space between the outward edges of rings 260 and the adjacent inner faces of the upwardly extending fingers of segment 268. Alternatively, the separate segments 270 may be formed as part of the segments 268. Special segments are also provided to embrace the lowermost rings 260 of felly 258. Thus, it may now be seen that the 120 rings 260 of felly 258 are maintained in operative juxtaposition to each other by means of a plurality of matrix members 264, each comprising a plurality of elastic segments 266, 268, 270, etc., all of the segments of a particular matrix member 264 so interfitting with each other, and with all of the rings 260, that each matrix member 264 substantially constitutes a single block of elastic material.

As may be seen in FIG. 6, the segments 266, 268 are so designed, in accordance with the principles of the present invention, as to provide sustaining forces that are largely compressional in nature and therefore do not lead to rupture of the matrix under tensile stresses. The segments 266, 268 so interengage, or interlock, that each upwardly projecting finger is supported against centrifugal stress by the ring 260 against which its curved outward surface bears, and, at the same time, each downwardly projecting finger of the segments 266, 268 is supported against centrifugal stress by the adjacent upwardly projecting finger against which it bears.

Subject to the inherent limitation on the thickness of the segments 266, 268 and their fingers referred to hereinbelow, the volume of elastic material used in the embodiment of FIG. 6 is kept at a practical minimum relative to that of the rings, both to increase the overall rotational energy density of the rotor and to eliminate unnecessary stresses in the matrix and the rings 260.

All of the segments 266, 268, 270, etc., of all of the matrix members 264 are preferably fabricated from low vapor pressure elastic material, such as silicone rubber. Further, according to a preferred embodiment, all of the elastic segments of each matrix member 264 are cemented or vulcanized or otherwise joined together.

It will be desirable in some embodiments to achieve balance of the rotor by angularly shifting the positions of the matrix members about the axis of felly 258, with respect to their mean or nominal positions, as shown in FIG. 5, by slightly shifting the segments 270, and their corresponding segments at the bottom of the matrix members 264 with respect to the remainder of the segments, or by other means which will occur to those having ordinary skill in the art.

Engagement between the matrix members 264 and core 262 is provided by means of protruberances or bosses 272 which are molded into the inner ends of at least the segments 266. Grooves or keyways 274 are provided in the outer surface of core 262, one groove or keyway to accommodate the bosses 272 of the inner surface of each matrix member 264. As best seen in FIG. 6A, each groove 274 terminates near the lower edge of core 262, leaving a wall 276. The lower bosses 272 of each of the matrix members 264 bearing upon their corresponding walls 276 (FIG. 6A) serve to maintain the assembly consisting of rings 260 and matrix members 264 with its top end aligned with the top end of core 262 and its bottom end aligned with the bottom of core 262. Due to the high rotary speeds of operation of the rotors of the inertial energy storage apparatus of the invention, said bosses 272 are sufficient to convey full operating power into and out of said assembly of rings 260 and matrix members 264.

Referring now to FIGS. 8, 9, and 9A, there is shown an additional embodiment of the present invention in which the rotor rings 280 of a rotor felly 282 are maintained in operative juxtaposition to each other, and to a cylindrical core 286, by means of a plurality of thin, metal clips 288. The clips necessary to give form to the rotor felly, taken collectively, will hereinafter be designated as the "matrix", although they are not directly interconnected.

In addition to the clips of the type 288 there are also provided clips of a second type 290, which are adapted to mechanically couple the assembly of rings 280 and clips 288 to core 286, as hereinafter explained.

As may be seen in FIG. 9, each of the clips 282 consists of four parts, a foot 292, two legs 294, 296, and a head 298. Each of these parts is separately fabricated from spring stock of the lightest gauge which conditions of service will permit. The dimensions of all of these parts 292, 294, 296, 298 perpendicular to the plane of FIG. 9 are substantially the same, and are as small as conditions of service will permit. In other words, each of the clips 288 is made as light as its intended use permits. All of the parts 292, 294, 296, 298 may, for instance, be fabricated from steel ribbon or tape, as narrow as their intended use will permit, and then treated, if necessary, to restore or impart the required mechanical properties, such as stiffness and elasticity.

As may further be seen in FIG. 9, each of the clips of the second type, 290, consists of three parts, a foot 300, a first leg 302, and a second leg 304. These clips 290 are fabricated from the same materials, in the same way, as the clips of the first type 288. The feet 300 of the clips 290 are substantially the same as the feet 292 of clips 288. The legs 302 of the clips 290 are substantially the same as the legs 294 and 296 of the clips 288. The straight legs 304 of the clips 290 are characteristic features of the clips 290, and no corresponding part is found in the clips 288. No parts corresponding to the heads 298 of the clips 288 are found in the clips 290. Rather, the projecting ends of the straight legs 304 of the clips 290 are adapted to engage slots in the outer surface of core 286, thereby mechanically coupling the assembly of rotor rings 288 and clips 288, 290 to core 282, as further explained hereinafter.

As may be seen in FIG. 9, the clips 288, 290 are designed, in accordance with the principles of the present invention, both to provide for differential radial expansion of the rotor rings 280 (through flexing of the radially innermost curved portions of the clip legs 294, 296, 302, and the clip heads 298), and at the same time to be stably supported at their outer ends by the pressure of their feet 292, 300 against a rotor ring 280.

Due to the very large centrifugal forces affecting each clip at typical operating speeds (e.g., 2,300 revolutions per second) the clips must also be made as light as possible. If, for example, a clip 282 were located at a radius of 15 centimeters in a rotor rotating at 2,300 revolutions per second, and had a mass of 0.03 grams, the outward force acting upon it would be about $10^8$ dynes (220 pounds). If, in this example, nine of these 0.03 gram clips were equiangularly disposed about the axis of the rotor, at a radius of 15 centimeters, the total outward force exerted by these clips upon the ring 280 against which their feet 292 bear would be about $9 \times 10^8$ dynes (2,000 pounds). If this ring, however, were an anchor ring of fused quartz, with a cross-sectional diameter of, say, 5 millimeters, fabricated in accordance with the teachings of the present invention, it would have an ultimate strength in tension approaching $2.7 \times 10^{10}$ dynes, i.e., about 60,000 pounds force, or approaching 30 times the added hoop force attributable to the mass of the nine clips. Inner rings 280, being at smaller radii, would generally experience lower clip forces, depending on the number of clips employed. Thus it may be seen that while twelve outer clips 282 are shown in FIG. 5, it is desirable, particularly at maximum operating speeds, to reduce the number of clips 282 lying between the outer shells of rings 280. It may be desirable, for example, in constructing certain embodiments of the present invention to reduce the number of clips 282 butting against each of the outermost rings 280 to three.

The separate parts of all of the clips 288 and 290 are joined by well-known techniques, e.g., spot welding, whereafter they are heat treated in such manner as to insure their resilience, if necessary.

As best seen in FIG. 9, the outer surface of core 286 is provided with a plurality of grooves or keyways 306, similar in function to the grooves or keyways 274 of the embodiment shown in FIG. 6. As seen in FIG. 9, the upper ends of said grooves or keyways extend to the upper end of core 286. On the other hand, as seen in FIG. 9A, the grooves 306 do not extend to the bottom of core 286; the bottom, terminating walls of grooves or keyways 306 being designated by the reference numeral 308.

Assembly of the inertial energy storage rotor felly 282 may be accomplished by assembling successive "walls" of rings around the core 282, installing the clips 290, 288 as the successive "walls" are built up around core 282, in the angularly staggered manner shown in FIGS. 8 and 9. It is a particular feature of this embodiment of the present invention that the independent clips 288 may be angularly shifted with respect to their uniform nominal positions in such a way as to achieve a high degree of balance of rotor felly 282. In particular, it is to be understood that, pursuant to a particular fabricational feature of the present invention, felly 282 may be balanced, on suitable test apparatus, after each "wall" of rings, and the associated set of clips, has been added thereto, by small shiftings of the then most recently installed set of clips, thereby assuring a high degree of balance throughout the mass of the rotor, which is highly desirable at the high speeds of rotation contemplated according to the plan of the present invention.

When the just described assembly method is adopted, and particularly when each "wall" of rotor rings is successively balanced, it will be desirable to employ rings having dual protective coatings, such as shown in FIG. 4A and explained hereinabove in connection therewith.

According to a further feature of the present invention, the rotor felly 282, after assembly, may be "potted", i.e., impregnated with elastic material in its fluid state, which is thereafter vulcanized or otherwise caused to set. According to a preferred method of carrying out this "potting" step, the assembled rotor is spun in a suitable hollow cylindrical housing to which fluid elastic material is admitted, thereby employing centrifugal force to produce, around the assembly of rings and clips described hereinabove, a dense mass of elastic material, of suitable configuration, and free from voids. This dense mass of elastic material may then be set by the application of heat by "soaking" in a proper oven, containing, if necessary, a suitable atmosphere other than ambient atmospheric air.

After all fabrication steps are completed, rotor felly 282, like rotor felly 258, may be assembled onto the spokes 142 of FIG. 2, thus being substituted for the rotor felly shown in FIG. 2.

As may be seen by comparison of FIGS. 6 and 9, a greater packing factor is achieved in the rotor felly 282 than is achieved in the rotor felly 258. That is to say, adjacent rings 280 are more closely spaced than adjacent rings 260.

It is desirable, according to the principles of the present invention, to achieve the highest possible rotor ring packing factor, since it is thereby made possible to achieve the highest possible values of inertial energy capacity per unit volume of the complete inertial energy storage module, $U_M$. Taking the criterion of maximum packing factor, or maximum $U_M$, into consideration, then, it may be seen upon reexamination of FIG. 9 that the maximum packing factor which can be achieved in rotor felly 282 is determined by the necessary thickness of the parts of the clips 288, 290.

The packing factor of rotor felly 258, on the other hand, may be increased above that shown in FIG. 6 by making the parts of the segments 266, 268, 270 thinner, as shown in cross-section in FIG. 6, without altering the width of the matrix members 264 (as seen in FIG. 5). (The cross-sectional thickness of the segments 266, 268, 270 was necessarily exaggerated in FIG. 6 for clarity of illustration.) However, the increase in packing factor which can be achieved by reducing the cross-sectional thickness of the elastic segments 266, 268, 270 of rotor felly 258 is inherently limited by the fact that segments 266, 268, 270 of insufficiently thick cross-section (as seen in FIG. 6) are insufficiently rigid for efficient assembly.

Referring now to FIG. 10, there is shown a partial cross-sectional view of a rotor construction by which high rotor ring packing factors and high $U_M$ may be achieved.

The rotor felly 309, shown in part only in FIG. 10, comprises 120 rotor rings 310 of the kind which constitute a principal feature of the present invention.

The rotor rings 310 are maintained in coaxial cylindrical arrays, and, at the same time, in parallel planar arrays, much as shown in FIG. 2, but as closely spaced as is permitted by their protective coatings 312. Disposed between the rings 310 are strips of elastic or resilient material 314. Elastic material 314 may, for instance, be extruded by well-known methods, the cross-section of the extrusion being such as to occupy the space between four adjacent rotor rings 310, or slightly larger, so that the extruded material is somewhat compressed when assembled into the rotor felly 309. For the purpose of mechanically coupling the assembly of rotor rings 310 and extrusions 314 to the core 320 of rotor felly 309, special inner surface extrusions 316 may be provided, which are of one-half the cross-section of the extrusion 314, and which are provided with bosses 318 adapted to be received in grooves or keyways 322 in core 320, much as the bosses 272 of the segments of the rotor felly 258 are received in the grooves or keyways 274 in the outer face of core 262. Thus, the assembly of rotor rings 310 and intervening extrusions 314 may be coupled to and supported on the core 320 of rotor felly 309.

By employing the construction shown and described in connection with FIG. 10, the rotor felly may be built up, layer-by-layer upon the core 320, and each layer balanced as it is added, as by removing small parts of the extrusions 314, or by employing less than full circumferential portions of the extrusions 314, and shifting these portions about the axis of the rotor felly being assembled.

It may be desirable, after assembly of a complete rotor felly, to subject the rotor felly to "soaking", i.e., low temperature heat treatment, in order to unite the outer coatings of the rotor rings 310 and the extrusions 314, 316 into what is substantially a single mass. Alternatively, suitable cements may be employed to thus unite the outer coatings of rings 310 and the extrusions 314, 316.

As will be apparent to those informed by the above teachings of the present specification, elastic material extrusions like elastic material extrusions 314 but of different cross-section may be provided in order to accommodate other juxtapositional arrangements of rotor rings. For example, suitable extrusions may be provided whereby the rings of a rotor felly may be disposed as shown in FIG. 9, but optimally closely adjacent each other.

Also, the method and extrusions of FIG. 10, or extrusions of a different cross-section, as described in the previous paragraph, may be employed to provide pairs of rotors the outer surfaces of which conform to the inner surface of spherical shell 16 (FIG. 1), thereby increasing the rotational energy capacity per unit module volume of certain inertial energy storage modules embodying the present invention.

Referring now to FIGS. 11 and 11A, there are shown partial cross-sectional views of a particular embodiment of the present invention in which the material of the rotor rings 323 is a composite or tensilely anisotropic material (see "Composites", FIG. 4).

In this embodiment of the present invention rotor rings 323 take the form of a plurality of thin cylinders. The thin cylinders 323 are maintained in operative juxtaposition by means of a plurality of matrix members 324, which constitute a feature of the present invention, and which are described in detail hereinbelow. The matrix members 324 also serve to secure the rotor felly of this embodiment of the present invention to the core 325. Core 325 is analogous in structure and function to core 154 shown in FIG. 2, and will not be further described at this point in the specification.

The matrix members 324 are formed from elastic material, such as silicone rubber. As shown in FIG. 11A, each matrix member 324 is elongated, and its long dimension extends parallel to the axis of the rotor. The upper end of each matrix member 324 is disposed close to but below the upper ends of the cylindrical shells 323 between which it is confined. The lower end of each matrix member 324 is disposed close to but above the lower ends of the cylindrical shell 323 between which it is confined. Thus, no matrix member 324 projects beyond the ends of the non-setting material shells 323, even when the rotor is rotating at maximum design speed.

The shape of the matrix members 324 shown in FIGS. 11 and 11A is an idealized representation of the shape assumed by these members when acted upon by the high values of centrifugal force produced at the contemplated maximum speed of rotation of the rotor (e.g., 2,300 revolutions per second).

As may be seen by comparison of FIGS. 11 and 11A, each matrix member 324 defines a hollow or chamber 326. Each chamber or hollow 326 is completely filled with a fluid 327, and is so sealed as to prevent leakage of any of the fluid 327.

The fluid 327 is selected for its compatibility with the material of the matrix members 324, i.e., so selected that it does not chemically attack or tend to age or otherwise deteriorate or degrade the material of the matrix members 324. Further, according to the present embodiment, the fluid 327 is a liquid selected for low compressibility, and for low density, as compared with the density of the elastic material from which the matrix members 324 are formed. A particular fluid which may be used in the embodiment of FIGS. 11 and 11A is methyl alcohol. While the fluid 327 of the present embodiment is a liquid, it is to be understood that in some embodiments of the present invention certain gases may be employed as the fluid 327.

As seen in FIG. 11, the upper end of chamber 326 in each matrix member 324 terminates in a cavity 328. The lower end of each chamber 326 terminates in a similar cavity 328' (not shown).

As seen in FIG. 11A, the outer wall 324.1 of chamber 326 may be of substantially uniform thickness, both from side to side and from end to end.

As may also be seen in FIG. 11A, the walls 324.2, 324.3 of chamber 326 which do not contact a ring 323 are relatively thick as compared with outer wall 324.1.

As may further be seen in FIG. 11A, the inner wall 324.4 of chamber 326 includes a relatively thick portion 329 and two relatively thin portions 329'. The relatively thick wall portion 329 is separated from the relatively thin wall portions 329' by a pair of ribs 324.5 and 324.6. The wall portions 329 and 329' are of substantially equal longitudinal extent (i.e., in a direction perpendicular to the plane of FIG. 11A).

In accordance with the principles of the present invention, the areas and thicknesses of wall portions 329 and 329' are so chosen that the hydrostatic pressure on each wall portion 329' produced by the outward movement of wall portion 329 in response to centrifugal force exceeds the corresponding centrifugal force acting upon the mass of the same wall portion 329'. Thus the wall portions 329' are forcibly thrust against the outer walls of the rings 323, rather than being withdrawn therefrom by the action of centrifugal force. In other words, the matrix members 324, including the chambers 326 and the wall portions 329 and 329' are so proportioned, taking into account the density and other mechanical properties of the material of the matrix members and the fluid 327, that the matrix members 324 expand radially in response to centrifugal force and thus compensate for the increased inter-shell spacing brought about by centrifugal force.

Thus, cemented joints between the walls 324.1 and 329' of the matrix members 324 and the corresponding wall portions of the adjacent rings 323 will be protected from rupture by the action of centrifugal force, which would in the absence of chamber 326 and fluid 327 compress the matrix members 324 and part these joints. In some embodiments of the present invention it may be found desirable to omit cement between the matrix members 324 and the shells 323, relying, instead, upon frictional forces therebetween.

One of the advantages of this aspect of the present invention is found in the fact that the outward pressure exerted by the radially expanding matrix members 324 opposes any tendency on the part of the shells 323 to delaminate, i.e., to rupture along circular or cylindrical locii, due to the low radial strength of the non-setting material rings 323 and the differences in hoop stress between the inner and outer portions of the shells 323. In order to enhance this delamination opposing factor, it may be found desirable to provide matrix members in the form of continuous cylindrical shells, containing pluralities of chambers 326, rather than in the form of independent members as shown in FIG. 11A. It also lies within the scope of the present invention to interconnect such independent chambers 326, or to employ a single cylindrical chamber 326 having a continuous alternation of thick wall members analogous to 329 and thin wall members analogous to 329' as its inner wall.

As will be recognized by those having ordinary skill in the art informed by this disclosure, the provision of separate matrix members 324 as shown in FIG. 11A has the advantage that these separate members may be circumferentially shifted with respect to uniformly angularly established normal positions in order to assist in the balancing of the rotor as a whole. However, when separate members 324 are provided, as in FIG. 11A, it will be necessary to provide sidewalls 324.2, 324.3 of sufficient thickness to avoid distortion by the hydrostatic pressures produced by the action of centrifugal force upon wall portion 329.

Further, measures must be taken to compensate for the effect of the hydrostatic pressure of fluid 327 upon the top wall 324.7 (FIG. 11) of each matrix member 324, and upon the bottom wall 324.7' (not shown) of each matrix member 324.

In the embodiment of FIGS. 11 and 11A this is accomplished by the provision of the hereinbefore described chambers 328 and 328'. As seen in FIG. 11, cavity 328 extends across the top end of the matrix member 324. Neither rib 324.5 nor rib 324.6 extend upward into cavity 328. Cavity 328 is provided with a thin wall section 329'', the thickness of which is substantially the same as the thickness of the abovesaid wall portions 329'. Thus, during rotation of the rotor, the hydrostatic pressure in fluid 327 produced by the outward movement of wall section 329 under the action of centrifugal force presses wall section 329'' inward against core 325 or one of the shells 323, thus providing a wedging action which maintains the top wall 324.7 of matrix member 324 in place against the hydrostatic pressure of fluid 327. As may also be seen in FIG. 11, the thickness of top wall 324.7 is sufficient to prevent substantial "ballooning" by the hydrostatic pressure of fluid 327.

The cavity 328' at the bottom wall 324.8 is similarly provided with a thin wall 329''', and operates in the same manner to prevent the bottom wall 324.8 from being "ballooned" out of the space between core 325 and shell 323.

In FIGS. 11 and 11A there is shown a cavity 324.9 existing between the outer wall of core 325 and the central portion of the inner wall of matrix member 324. As pointed out hereinabove, the shape of matrix member 324 as shown in FIGS. 11 and 11A is an idealized representation of the shape thereof assumed under the action of centrifugal force at full operating speed, and the action of the fluid in chamber 326. In this embodiment, then, the cavity 324.9 is that produced by centrifugal force, the inner wall 324.4 of matrix member 324 being in contact with the outer wall of core 325 or a shell 323 throughout when the rotor is standing still and not rotating. In certain embodiments of the present invention, however, it may be found desirable to provide a cavity such as 324.9 which exists even in the standing condition of the rotor in order to properly position the wall portion 329 whereby to subject the wall portion 329 to greater centrifugal force than the wall portion 329', and such construction is within the scope of the present invention.

The individual thin cylinders or rings 323 may be fabricated from composite materials such as carbon fiber-epoxy by obvious adaptations of methods well-known to those having ordinary skill in the art of fabricating parts from such composite materials.

For example, thin cylindrical shells of carbon fiber-epoxy composite materials can be prepared by building up successive layers of fiber roving, wound peripherally around a cylindrical form, and impregnating such layers with epoxy resin, after first applying an appropriate release agent to the cylindrical form. A different form of suitable diameter will, of course, be necessary for the fabrication of each of the thin cylindrical shells 323. Also, the epoxy resin may be deposited during winding of the fiber rovings, rather than after completion of the rovings of a particular layer.

After a shell of the desired thickness has been built up, the shell maybe removed from the cylindrical form, tested for dimensional accuracy and strength, and thereafter assembled, along with other cylindrical shells 323, etc., to form a rotor felly of the embodiment of FIGS. 11 and 11A.

A vehicle propulsion system embodying a particular aspect of the present invention is shown in FIG. 12.

In accordance with that aspect of the present invention, a vehicle propulsion system of high bilateral conversion efficiency is provided by combining high efficiency, bilateral static frequency converter (or cycloconverter) means with inertial energy storage apparatus and vehicle wheel motors in such a way that energy from the inertial energy storage apparatus is not only supplied to the wheel motors at high efficiency but is recovered from the wheel motors and stored in the inertial energy storage apparatus at high efficiency when the vehicle is braking or travelling down hill.

As shown in FIG. 12, a particular vehicle propulsion system according to the present invention comprises a rotor assembly 330, by which is meant one or more inertial energy storage modules, preferably of the kind embodying the present invention.

Electrical power from rotor assembly 330 is supplied to a cycloconverter assembly 332 by means of suitable electrical leads 334, 336. (It is to be understood that the solid lines 334, 336 do not represent single wires or cables, but rather represent such combinations of power cables, connectors, etc., as would be supplied by those having ordinary skill in the art. If, for instance, rotor assembly 330 were four inertial storage modules of the kind shown and described herein in connection with FIGS. 1 through 3, then lines 334, 336 would represent four sets of module leads (one set being designated by the reference numerals 52, 54, 56, 60, 62, 64 in FIG. 1), cables or busses suitable for interconnecting those module leads as a single, three-phase source, and three busses or cabled wires extending from the motor interconnecting busses or cables to the input terminals of the cycloconverter assembly 332.

The other electrical and hydraulic interconnections shown in FIG. 12 are to be similarly broadly interpreted, with reference to the Key shown in FIG. 12.

Cycloconverter assembly 332 may, for instance, comprise three commercially available cycloconverters or lightweight static frequency converters of the kind made and sold by the Power Equipment Division of Lear Siegler, Inc., of Cleveland, Ohio, Model No. 41128–000 (see four page brochure of Lear Siegler, Inc., B2693 LSA, Copyright 1966, File No. 6055). The operating principles and applications of such cycloconverters are described in detail in an article by George E. Pinter of the Power Equipment Division, Lear Siegler, Inc., Cleveland, Ohio, entitled "The Cycloconverter Adjustable-Speed Drive," commencing at page 150 of the June 23, 1966, edition of Machine Design magazine, published by The Penton Publishing Company, Cleveland, Ohio.

When cycloconverter assembly 332 comprises three of said Model No. 41128–000 lightweight static frequency converters, the rotor assembly 330 may, for instance, comprise a plurality of the inertial energy storage modules of the present invention, as shown and described hereinabove in connection with FIGS. 1 through 3, the rotors of these inertial energy storage modules being so constructed and arranged that the three-phase output voltages produced between the output busses of the rotor assembly 330 are relatively high frequency, e.g., 2000 cycles per second, and of 110 volts amplitude. When such a rotor assembly arrangement is employed, the required input, line-to-line voltage of 440 volts to the Model No. 41128–000 lightweight static frequency converters may be provided by means of a suitable three-phase transformer in lines 334, 336, the windings of this transformer being preferably wound from Litzendraht wire in order to minimize eddy current losses.

The lines 338, 340, 342, and 344 representing the power interconnections between cycloconverter assembly 332 and the respective wheel motor assemblies 346, 348, 350, and 352 do not represent single, separate cables or busses, but rather, as noted hereinabove, represent suitable interconnections which may be supplied by those having ordinary skill in the art.

Each wheel motor assembly 346, 348, 350, 352 may, for instance, be of the type shown and described in the article "*Now They've Put Motors Inside Every Wheel*", by W. Stephenson Bacon, commencing at page 86 of the August, 1966, edition of the Popular Science magazine. (Such prior art wheel motor assemblies are further described in the abovesaid article, "The Cycloconverter Adjustable Speed Drive".)

As will be evident to those having ordinary skill in the art on reading the abovesaid article of W. Stephenson Bacon, many aspects of the system described in that article other than the wheel motor assemblies may be adapted to the vehicle propulsion system of the present invention shown in FIG. 12.

It will also be evident, however, that these systems differ radically. The system of the Bacon article is unilateral, and therefore unadapted to achieve the economies in national energy resources and vehicle operating costs referred to hereinabove, whereas the system of the invention shown in FIG. 12 is possessed of high bilateral conversion efficiency and therefore is well adapted to promote the attainment of these economies.

The energy flowing from the wheel motors of the truck of the Bacon article is not returned to energy storage means, but is merely wasted, in the form of heat dissipation. In the device of the present invention shown In FIG. 12, on the other hand, during downhill travel and braking, energy flows from the wheel motor assemblies 346, 348, 350, and 352, via leads 338, 340, 342, and 344 into the inherently bilateral cycloconverter assembly 332, and thence, via power leads 334, 336 into rotor assembly 330, where it is stored as rotational energy in the several rotors.

To this end, circuit means are provided whereby the frequency of the electrical energy fed back from cycloconverter assembly 332 to the motors of the rotor assembly leads the momentary rotary speed of the rotors by that slip frequency necessary to supply maximum speedup torque to the rotors. The provision of such circuit means is within the scope of one having ordinary skill in the art to which the abovesaid cycloconverter and electrically powered truck belong, since the truck of the Bacon article is provided with such slip frequency control means which operate with its accelerator pedal in order to maintain the desired speed, proportional to the depression of the accelerator pedal. Thus, in controlling the return of energy from the wheel motor assemblies to the rotor assembly it is necessary merely to "slave" the frequency of the cycloconverter assembly to the frequency of the electrical output of the rotor assembly, rather than to an arbitrary signal corresponding to degree of accelerator pedal depression.

Rotor speed indicating and limiting means are also provided. The output voltage of rotor assembly 330 is sampled, via lead 354, which may, for instance, include an instrument transformer or the like, and supplied to a frequency meter 356, which is calibrated in units of rotor speed in accordance with principles well known to those having ordinary skill in the art. In addition, the sampled output voltage of rotor assembly 330 is supplied via a suitable instrument line 358 to a band pass filter 360, and thence via a second instrument cable 362 to the cycloconverter assembly 332. The operating bias of the silicon controlled rectifiers of the cycloconverter assembly 332 is so controlled by the presence of the signal on control cable 362 from band pass filter 360 that the flow of energy (in either direction) through the cycloconverter assembly is blocked whenever the frequency of the rotor assembly output voltage falls outside the pass band of band pass filter 360. By this means it is assured that rotor assembly 330 cannot be "overcharged", i.e., the rotors overspeeded beyond their rated limit, nor "undercharged", i.e., allowed to be discharged down to speeds below those at which the periodic magnetic bearings supporting the rotors are fully effective. It may be desirable in some vehicle propulsion systems embodying the present invention to employ the signal on lead 362 to operate power relays which open, say, power lines 336, rather than to thereby control the operating bias of the silicon-controlled rectifiers of the cycloconverter assembly 332, and it is to be understood that both expedients, as well as all other expedients known to those having ordinary skill in the art, fall within the scope of the present invention.

According to another aspect of the present invention, the vehicular propulsion system shown in FIG. 12 is provided with suitable charging terminals 364, and charging cables 366, whereby the rotor assembly 330 may be "charged", i.e., its rotors brought up to maximum design speed, by means of electrical power supplied at a roadside service station, or in the vehicle owners' garage, overnight. Line 354 may also be brought out to a suitable terminal to provide a control voltage to control the frequency of the charging source.

In accordance with the present invention, the frequency of the power supplied to the rotor assembly 330 from the cycloconverter assembly 332 is controlled in accordance with the momentary rotor speed of the rotors of rotor assembly 330, whereby to assure that the frequency of the electrical power supplied by the cycloconverter assembly 332 to the rotor assembly 330 is such as to assure that, at all times during charging of rotor assembly 330 by the cycloconverter, the maximum torque is imparted to the rotors of rotor assembly 330.

As shown in FIG. 12, the action of the cycloconverter assembly 332 is controlled by an accelerator pedal assembly 368 (via control lines 370) and a brake pedal control assembly 372 (via control lines 374.) The accelerator pedal assembly 368 is constructed along the general principles of the accelerator pedal assembly of the truck of the Bacon article, while the brake pedal assembly 372 is also constructed and arranged along the principles of design of the similar element of the truck of the Bacon article, except that braking is accomplished in the system of the invention shown in FIG. 12 by returning the braking energy to storage in rotors of rotor assembly 330, rather than dissipating this energy in resistors or the like.

In the event that one or more reserve rotor assemblies are provided, appropriate switching may also be provided to disconnect discharged rotors and to connect other rotors in operative relationship to the wheel motor assemblies. This operation may be made automatic, in response to the state of inertial energy storage module charge, i.e., in response to the presence or absence of a band pass filter output signal on line 362.

To provide for reversing the direction of travel of a vehicle equipped with the vehicular propulsion system of the present invention shown in FIG. 12 a forward-reverse switch 376 is provided, which is electrically coupled to cycloconverter 332 via control cable 378.

In general, the operation of the accelerator pedal 368 and brake pedal 372 is as follows:

If switch 376 has been moved from its "neutral" position to either forward or reverse, depressing accelerator pedal 368 will cause power to flow from the rotor assembly 330 to the wheel motors 346, 348, 350, 352 at a rate determined by the degree of depression of accelerator pedal 368.

As in an ordinary motor car, the vehicle will then accelerate until it reaches a speed determined by the accelerator pedal depression and existing road conditions. When the operator of the vehicle reduces the degree of depression of accelerator pedal 368 the positive power flow ceases, and, when accelerator pedal 368 is allowed to rise sufficiently under the urging of its associated spring, the power flow reverses, i.e., power from the wheel motor assemblies passes through the cycloconverter assembly 332 and into rotor assembly 330, thus gently slowing the vehicle, simulating the action of slowing under "compression" of an ordinary gasoline-driven automobile.

If brake pedal 372 is then depressed, negative or reverse power flow will be further increased, again at a level determined by foot pressure on the brake pedal 372.

Under "panic stop" conditions, i.e., pedal pressures and depressions beyond a predetermined minimum value, a back-up hydraulic or other mechanically operated brake system will also come into operation, to provide for emergency stops, for "fail-safe" brake operation, and for other contingencies.

In accordance with the teachings of the abovesaid copending U.S. Patent Application of Stephen F. Post, the energy storage capacity per unit volume and resistance to centrifugal stress of inertial energy storage rotors of the present invention may be increased by graduating the mechanical properties of the rotor rings in such a way as to satisfy the following equation $$\Psi/\rho = Cr^{n(r)},$$

sometimes hereinafter called equation A, in which, $r$ is the mean radius of any particular ring, $Y$ is the Young's Modulus of said particular ring, i.e., the Young's Modulus of a linear specimen of the material of said particular ring, fabricated in substantially the same way as said particular ring, and of the same cross-section as said particular ring, $\rho$ is the mean density of said particular ring, $C$ is an empirically determined constant, and $n(r)$ includes constant values, i.e., values which are the same for all of the rings of a particular rotor.

In accordance with another particular feature of the invention claimed in U.S. Pat. Application Ser. No. 68,959 of Stephen F. Post referred to in the previous paragraph, in a particularly advantageous embodiment thereof the Young's Moduli of all of the rings of a rotor conforming to equation A are made substantially equal. That is to say, the Young's Modulus of each ring is made substantially equal to the Young's Modulus of all of the other rings of a particular rotor, while the mean densities of the rings vary with their radii in accordance with equation A.

Such rotor rings may be fabricated from certain novel embedded-fiber composite materials which are a particular feature of the present invention. These novel materials comprise carbon fibers and tungsten fibers embedded in a matrix of plastic or metal, e.g., epoxy. In accordance with this invention, the Young's Modulus of all of the carbon fibers of all of the rings is made substantially equal to the Young's Modulus of the tungsten fibers.

It is known that the Young's Modulus of carbon fibers may be controlled over a range of about $1 \times 10^{12}$ dynes per square centimeter to $4 \times 10^{12}$ dynes per square centimeter by heat treatment (see "Carbon Fiber Composites for Aerospace Structures," by A. C. Ham, Physics Bulletin, 20, 444 (1969)). The Young's Modulus of tungsten ($3.5 \times 10^{12}$ dynes per square centimeter) falls within this range. Thus, it is possible by heat treatment to produce carbon fibers the Young's Modulus of which match the Young's Modulus of tungsten.

The tensile strength of carbon fibers when thus heat treated is about $2 \times 10^{10}$ to $3 \times 10^{10}$ dyner per square centimeter, which is comparable to the tensile strength of tungsten fibers (about $4 \times 10^{10}$ dynes per square centimeter), and thus the novel composite materials of the present invention may be made to possess tensile strengths closely approximating the tensile strengths of prior art carbon fiber-epoxy composite materials, even at high percentages of tungsten fiber content.

Since the Young's Modulus of the tungsten fibers and the carbon fibers are made substantially equal, the percentages by volume of carbon fibers and tungsten fibers in each ring necessary to attain ring densities conforming to equation A in a particular embodiment of this feature of the present invention may be determined by reference to the following example.

An inertial energy storage rotor embodying this feature of the present invention may, for instance, have in its felly seven thin cylindrical shells of said novel composite materials arranged in concentric array.

Let these seven shells of rings be designated S-1 through S-7.

Further, let it be assumed that the percentage by volume of matrix material (epoxy) is 40 percent in all of these shells.

The density of carbon fibers heat treated to attain a Young's Modulus substantially equal to that of tungsten (at about 2,000° C.) is approximately 2 grams per cubic centimeter. When such carbon fibers are embedded in an epoxy matrix such that the percentage by volume of matrix material is 40 percent, the density of the resulting composite fiber is about 1.6 grams per cubic centimeter. The density of tungsten fibers is about 19 grams per cubic centimeter. The density of composite fibers consisting of 60 percent tungsten fiber and 40 percent epoxy by volume is about 11.8 grams per cubic centimeter.

Thus, it may be seen that, assuming the percentage by volume of epoxy matrix material to be 40 percent, the density of said novel composite materials may be varied between 1.6 grams per cubic centimeter and 11.8 grams per cubic centimeter, as exemplified in the following table.

| Volume % C | Volume % W | Density of Composite |
|---|---|---|
| 60.0 | 0.0 | 1.6 Gm/cm³ |
| 50 | 10 | 3.3 |
| 40 | 20 | 5.0 |
| 30 | 30 | 6.7 |
| 20 | 40 | 8.4 |
| 10 | 50 | 10.1 |
| 0 | 60 | 11.8 |

From this table it can be seen that, keeping the Young's Modulus Y constant, equation A can be satisfied so long as the mean diameter of the smallest rotor shell is at least 37 percent of the mean diameter of the largest rotor ring.

In this example, then, having the number and arrangement of rings and percentage by volume of epoxy matrix material set out immediately above, and further assuming the diameter of the smallest ring to be 40 percent of the diameter of the largest ring, the percentages by volume of carbon fibers and tungsten fibers in each of the abovesaid shells, S-1 through S-7, may be determined from the following table.

| Shell | Radius (%) | Volume % Carbon Fiber | Volume % Tungsten Fiber |
|---|---|---|---|
| S-1 | 40 | 11 | 49 |
| S-2 | 50 | 32 | 28 |
| S-3 | 60 | 43.5 | 16.5 |
| S-4 | 70 | 50.5 | 9.5 |
| S-5 | 80 | 54.6 | 5.4 |
| S-6 | 90 | 58 | 2 |
| S-7 | 100 | 60 | 0.0 |

It will thus be seen that the object set forth above, among those made apparent from the preceding description, are efficiently attained, and, since certain changes may be made in the above constructions without departing from the scope of the invention, it is intended that all matter contained in the above description, or shown in the accompanying drawings, shall be interpreted as illustrative only, and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new, and desire to secure by Letters Patent, is:

I claim:

1. An energy storage rotor for use in an inertial energy storage system, comprising:
   a plurality of energy storage rings including an outer ring and at least one inner ring the growth of which in response to centrifugal force is unrestrained by said outer ring, and
   supporting means supporting said rings in operative juxtaposition and permitting the radial separation between adjacent ones of said rings to become greater than their radial separation at standstill.

2. An energy storage rotor as claimed in claim 1 in which at least some of said rings are continuous rings of tensilely isotropic material, the modulus $U_0$ of said at least some of said rings exceeding 300 Joules per gram, where $$U_o = K/2\rho,$$

$K$ is the ultimate tensile strength of said at least some of said rings in dynes per square centimeter, and $\rho$ is the mean density of said at least some of said rings in grams per cubic centimeter.

3. An energy storage rotor as claimed in claim 2 in which said tensilely isotropic material is fused quartz.

4. An energy storage rotor as claimed in claim 2 in which each of said rings of tensilely isotropic material is provided with at least one surface protective coating.

5. An energy storage rotor as claimed in claim 1 in which at least some of said rings are composite bodies comprising a plurality of elongated fibers embedded in a matrix of bonding material.

6. An energy storage rotor for use in an inertial energy storage system, comprising:
   a plurality of rings, the modulus $U_0$ of each of said rings exceeding 300 Joules per gram, where $$U_o = K/2\rho,$$

$K$ is the ultimate tensile strength of each of said rings in dynes per square centimeter, and $\rho$ is the mean density of each of said rings in grams per cubic centimeter; and
   supporting means supporting said rings in operative juxtaposition and permitting the radial separation between adjacent ones of said rings to become greater than their radial separation at standstill.

7. An energy storage rotor as claimed in claim 6 in which at least some of said rings are continuous rings of tensilely isotropic material.

8. An energy storage rotor as claimed in claim 7 in which each of said rings of tensilely isotropic material is provided with at least one surface protective coating.

9. An energy storage rotor as claimed in claim 7 in which said tensilely isotropic material is fused quartz.

10. An energy storage rotor as claimed in claim 6 in which at least some of said rings are composite bodies comprising a plurality of elongated fibers embedded in a matrix of bonding material.

11. An energy storage rotor as claimed in claim 10 in which at least some of said composite bodies comprise fibers of diverse materials.

12. An energy storage rotor as claimed in claim 11 in which said diverse materials are carbon and tungsten.

13. An energy storage rotor for use in an inertial energy storage system, comprising:
   a felly comprising a plurality of rings of high strength material maintained in operative juxtaposition by supporting means, said supporting means permitting the radial separation between adjacent ones of said rings to become greater than their radial separation at standstill;
   a hub; and
   a plurality of spokes, each of said spokes being tapered outwardly so that its maximum dimension at the outer surface of said hub is greater than its maximum dimension at the inner surface of said felly.

14. An energy storage rotor as claimed in claim 13 in which at least some of said rings are continuous rings of tensilely isotropic material, the modulus $U_0$ of said at least some of said rings exceeding 300 Joules per gram, where $$U_o = K/2\rho,$$

$K$ is the ultimate tensile strength of said at least some of said rings in dynes per square centimeter, and $\rho$ is the mean density of said at least some of said rings in grams per cubic centimeter.

15. An inertial energy storage system, comprising:
   an inertial energy storage rotor,
   a spindle,
   at least one magnetic bearing by means of which said rotor is journalled on said spindle, and
   a dynamoelectric machine comprising rotor structure and stator structure, the rotor structure of said dynamoelectric machine being mounted in said energy storage rotor, and the stator structure of said dynamoelectric machine being mounted in said spindle, said dynamoelectric machine being capable of both motor action and dynamo action.

16. An inertial energy storage system as claimed in claim 15 in which said energy storage rotor is mounted in an at least partially evacuated chamber and said chamber is disposed in a slurry of crushable particles in a liquid medium.

17. An inertial energy storage system as claimed in claim 16 in which the density of said slurry is such that the buoyancy factor of said chamber with respect thereto is slightly negative.

18. An energy storage rotor for use in an energy storage system, comprising:
   a plurality of energy storage rings, and
   supporting means disposed between said rings and supporting said rings in operative juxtaposition, said supporting means being so constructed and arranged as to expand radially in response to centrifugal force resulting from the rotation of said rotor.

19. An energy storage rotor for use in an energy storage system, comprising:
   a plurality of energy storage rings, and
   supporting means disposed between said rings and supporting said rings in operative juxtaposition, said supporting means being so constructed and arranged as to expand in response to centrifugal force resulting from the rotation of said rotor, said supporting means comprising
   wall means, said wall means defining sealed cells, the walls of said sealed cells nearest the axis of said rotor including thick displaceable portions and thin displaceable portions; and
   fluid filling said sealed cells;
   the relative areas and thicknesses of said thick wall portions and said thin wall portions being so selected that the centrifugal force acting on said thick wall portions, transmitted through said fluid, forces said thin wall portions toward the axis of said rotor, thus causing the overall radial thickness of said supporting means to increase at least enough to compensate for the corresponding increase in the separation between said rings brought about by centrifugal force.

* * * * *